(12) United States Patent
Carmichael et al.

(10) Patent No.: US 11,678,676 B2
(45) Date of Patent: Jun. 20, 2023

(54) FOAMING PRESSURIZED BEVERAGE

(71) Applicant: La Colombe Torrefaction, Inc., Philadelphia, PA (US)

(72) Inventors: Todd Carmichael, Gladwyne, PA (US); Patrick Libois, Philadelphia, PA (US); Edward Green, Philadelphia, PA (US)

(73) Assignee: La Colombe Torrefaction, Inc., Philadelphia, PA (US)

( * ) Notice: Subject to any disclaimer, the term of this patent is extended or adjusted under 35 U.S.C. 154(b) by 262 days.

(21) Appl. No.: 17/098,778

(22) Filed: Nov. 16, 2020

(65) Prior Publication Data
US 2021/0059272 A1 Mar. 4, 2021

Related U.S. Application Data

(60) Continuation of application No. 16/037,551, filed on Jul. 17, 2018, now Pat. No. 10,893,683, which is a division of application No. 14/982,583, filed on Dec. 29, 2015, now Pat. No. 10,051,874.

(60) Provisional application No. 62/157,873, filed on May 6, 2015.

(51) Int. Cl.
| | |
|---|---|
| A23C 9/152 | (2006.01) |
| B65D 85/72 | (2006.01) |
| A23L 2/40 | (2006.01) |
| A23F 5/24 | (2006.01) |
| A23L 2/02 | (2006.01) |
| A23G 1/56 | (2006.01) |
| A23L 2/54 | (2006.01) |
| B65B 31/04 | (2006.01) |
| A23L 2/52 | (2006.01) |
| A23C 9/154 | (2006.01) |
| B65D 81/20 | (2006.01) |
| B65B 31/06 | (2006.01) |

(52) U.S. Cl.
CPC ............ *A23C 9/1524* (2013.01); *A23C 9/154* (2013.01); *A23F 5/243* (2013.01); *A23G 1/56* (2013.01); *A23L 2/02* (2013.01); *A23L 2/40* (2013.01); *A23L 2/52* (2013.01); *A23L 2/54* (2013.01); *B65B 31/04* (2013.01); *B65B 31/06* (2013.01); *B65D 81/2053* (2013.01); *B65D 85/72* (2013.01); *A23C 2270/10* (2013.01); *A23V 2002/00* (2013.01); *A23V 2200/226* (2013.01); *A23V 2250/10* (2013.01); *A23V 2250/5022* (2013.01); *A23V 2250/5086* (2013.01); *B65B 2220/14* (2013.01)

(58) Field of Classification Search
None
See application file for complete search history.

(56) References Cited

U.S. PATENT DOCUMENTS

| | | | | |
|---|---|---|---|---|
| 1,912,439 | A | * 6/1933 | Feller | A23C 9/1524 426/477 |
| 2013/0209649 | A1 | * 8/2013 | Chanet | A23C 9/1524 426/594 |
| 2014/0234514 | A1 | * 8/2014 | Finley | A23L 3/3445 426/474 |

* cited by examiner

*Primary Examiner* — Jyoti Chawla
(74) *Attorney, Agent, or Firm* — Stradley Ronon Stevens & Young, LLC

(57) ABSTRACT

A method of making a pressurized packaged liquid beverage including filling a container including a one-way valve with a liquid mixture including a base liquid and a gum; sealing the container; introducing a volume of gas through the one-way valve after sealing the container; and agitating the container. When the container is opened, the liquid mixture increases in volume and separates into a liquid phase and a drinkable foam phase, which may persist for an extended period of time. The base liquid includes milk, coffee, fruit juice, or mixtures thereof.

7 Claims, 23 Drawing Sheets

FOAMING PRESSURIZED BEVERAGE

RELATED APPLICATION

The present invention is related to U.S. patent application Ser. No. 16/037,551 titled "Foaming Pressurized Beverage," filed on behalf of the inventors and assigned to the Applicant of the present application and incorporated in this application by reference, which is itself related to U.S. patent application Ser. No. 14/982,583 titled "Foaming Pressurized Beverage," filed on behalf of the inventors and assigned to the Applicant of the present application and incorporated in this application by reference. This application claims the benefit of priority to U.S. Provisional Patent Application Ser. No. 62/157,873, filed on May 6, 2015, the contents of which are incorporated in this application by reference.

TECHNICAL FIELD

The present invention relates generally to packaged pressurized beverages, and particularly to a packaged pressurized milk beverage which, when opened, stretches into a texturized/aerated beverage with a silky drinkable foam phase on top of a liquid phase.

BACKGROUND

Textured/aerated milk, also sometimes referred to as stretched milk, steamed milk, or milk froth, is a common component of many beverages, particularly professionally prepared coffee beverages, such as lattes and cappuccinos, and milk substitute beverages, such as smoothies. Traditionally, textured milk is produced by inserting a steam wand into a container of milk and then adding steam to the milk to warm the milk and introduce air bubbles into the milk. Other methods of producing textured milk are known including aerating warm milk with a handheld device such as an immersion blender or even a whisk, though typically with less desirable results. As used herein, milk may refer to any animal milk, such as cow milk, or milk substitutes such as almond milk, soy milk, etc. Milk may also refer to other dairy products such as yogurt.

However, there is currently no suitable method of creating a pre-packaged milk beverage that is able to reproduce the effect of properly made textured milk without requiring the equipment described above. Although many products are available purporting to include a canned latte or cappuccino beverage, these products often suffer from any of a number of flaws, including little to no milk texture, or a very short hard and dry foam floating on top. For example, one technique that only produced a dry hard foam involves supersaturating the milk with a gas, typically a nitrogen oxide ($NO_x$) in a large pressure chamber prior to packaging and then quickly capturing the expanding liquid in a can or bottle. The outcome of this technique is far inferior to the professional-grade aerated texture described above.

Accordingly, it is desirable to provide a new method of packaging a liquid beverage which, upon opening, produces a volume of a stable foam without requiring manual aeration.

SUMMARY

Embodiments of the invention include a method of making a pressurized liquid beverage. The method includes filling a container such as a can, bottle, or keg with a liquid mixture including a base liquid and a gum; sealing the container; introducing a volume of gas into the container through a one-way valve; and agitating the container. The base liquid may include milk, coffee, fruit juice, or mixtures thereof. The base liquid may include a mixture of milk and coffee, and may further include chocolate. The gum may be a mixture of one or more gums including acacia gum, guar gum, locust bean gum (also known as carob gum), carrageenan, pectin, and xanthan gum. The container may be agitated simultaneously with introducing the volume of gas. The gas may be nitrogen dioxide. The pressure inside the container after introducing the volume of gas and agitating the container is at least approximately 20 pounds per square inch (psi). The pressure may be approximately 20 to approximately 40 psi. The liquid mixture may be fully saturated with gas after introducing the volume of gas and agitating the container. When the container is opened, the liquid mixture increases in volume and separates into a liquid phase and a drinkable foam phase, which may persist for at least 10 minutes after opening the first container.

Embodiments further include a pressurized liquid beverage product including a sealed container having a one-way valve adapted to allow a gas to enter the first container but not exit, and a liquid mixture contained in the container. The container may be a can, bottle, or keg. The liquid mixture includes a base liquid and a gum and is saturated with a volume of gas. The pressure inside the sealed container ranges from approximately 20 psi to approximately 60 psi. When the container is opened, the liquid mixture increases in volume and separates into a liquid phase and a drinkable foam phase, which may persist for at least 10 minutes after opening the first container. The base liquid may include milk, coffee, fruit juice, or mixtures thereof. The base liquid may include a mixture of milk and coffee, and may further include chocolate. The gum may be a mixture of one or more gums including acacia gum, guar gum, locust bean gum (also known as carob gum), carrageenan, pectin, and xanthan gum. The gas may be nitrogen dioxide.

BRIEF DESCRIPTION OF DRAWINGS

The invention is best understood from the following detailed description when read in conjunction with the accompanying drawing. It is emphasized that, according to common practice, the various features of the drawing are not to scale. On the contrary, the various features are arbitrarily expanded or reduced for clarity. Included in the drawing are the following figures.

DETAILED DESCRIPTION

Embodiments of the present invention include beverages packaged in a sealed, pressurized container that, when opened, expand in volume before separating into a liquid beverage phase and a stable textured phase above the beverage phase. The beverage may include milk or a milk substitute, and may also include coffee. Embodiments further include a method of packaging the beverage to achieve the result described above.

Figure 1:
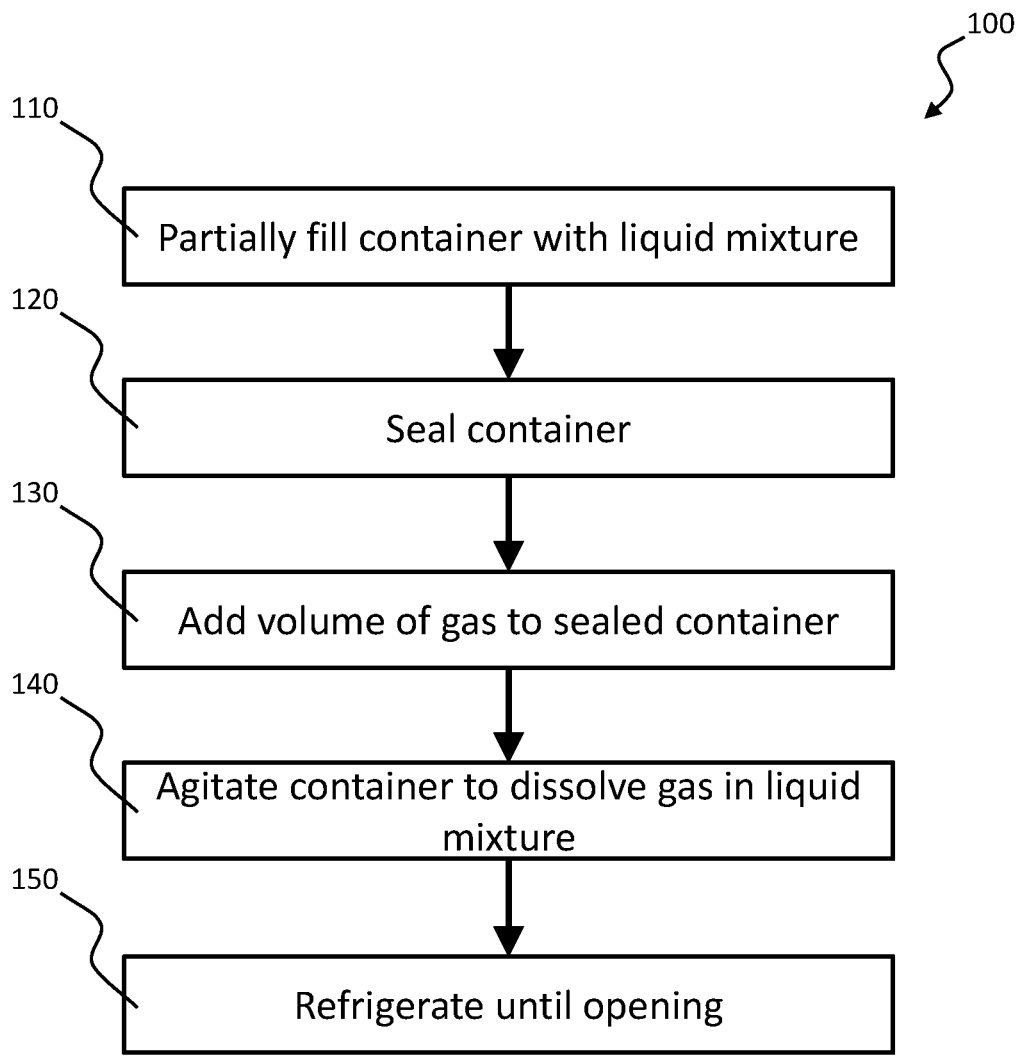
FIG. 1 is a flow chart of a method for producing a pressurized milk beverage, according to an exemplary embodiment of the invention.

Referring now to the drawing, in which like reference numbers refer to like elements throughout the various figures that comprise the drawing, FIG. 1 depicts a method 100 including steps 110-150 for preparing a pressurized beverage. Although the steps are listed in a given order (i.e., first, second, third, etc.), it will be understood that some steps may be performed out of order and that any number of unlisted steps may be included between the steps 110-150 (e.g., the method may include a step between steps 110 and 120 not included in FIG. 1).

Figure 2:
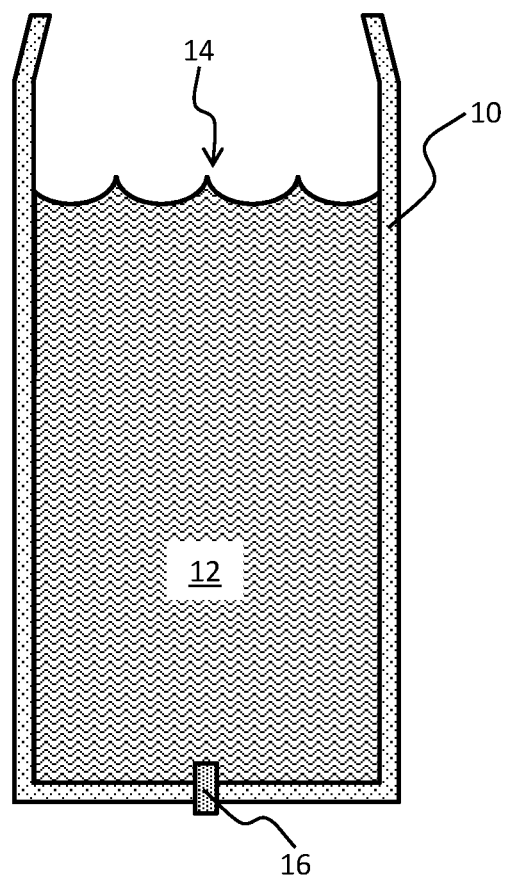
FIG. 2 is a cross-sectional view depicting a first container being filled with a liquid mixture, according to an exemplary embodiment of the invention.

Referring now to FIG. 2, at the first step 110 of the method 100, a first container 10 is filled with a liquid mixture 12. The first container 10 may be one of any number of vessels suitable for packaging beverages that may be sealed, pressurized with a gas, and reopened as described in more detail below, such as cans, bottles, kegs, etc. In an exemplary embodiment, the first container 10 is a metal (e.g., aluminum) can. The first container 10 is adapted to allow gas to be introduced into the first container 10 after it is sealed, for example by including a one-way valve 16. In an exemplary embodiment, the one-way valve 16 is incorporated into the bottom of the first container 10. However, other embodiments may include the one-way valve located in any other suitable location, for example the side of the first container 10 (not shown), or the element used to seal the can (described in more detail below). The one-way valve 16, for example, may be a permeable membrane through which a syringe can be introduced into the interior of the first container 10 but which does not allow gas or liquid to exit the first container 10. The one-way valve 16 is preferably a FDA-approved gassing valve. In other embodiments, any other one-way valve may be used. The first container 10 is only partially filled with the liquid mixture 12 such that a headspace 14 remains above the liquid mixture 12. In an exemplary embodiment, the volume of the liquid mixture 12 ranges from approximately 85% to approximately 95% of the volume of the first container 10, with the headspace 14 forming the balance of the volume of the first container 10 (i.e., approximately 5% to approximately 15% of the volume).

The liquid mixture 12 includes at least a base liquid and a gum. In a exemplary embodiment, the gum is acacia gum (also referred to as gum arabic), guar gum (also referred to as guaran), locust bean gum (also known as carob gum), pectin, xanthan gum, or mixtures thereof. Other gums are also suitable, such as carrageenan. Carrageenan is suspected to be a possible carcinogen, however, and although it will be understood to produce the desired effect in embodiments of the present invention, it is not preferred. The gum may be added to the liquid mixture 12 in a concentration ranging from approximately 0.1 wt. % to approximately 0.5 wt. %. As described in more detail below, the gum is added as a popping inhibitor which allow bubbles to form and grow into a stable drinkable foam when the first container 10 is opened. The preferred amount of gum will depend on the base liquid as well as the desired foam characteristics. Base liquids which are naturally more viscous will require less gum in order to achieve the same effect.

In an exemplary embodiment, the base liquid of the liquid mixture 12 is milk. In some embodiments, "milk" refers to an animal milk including both milk proteins and milk fat, preferably cow's milk. In other embodiments, the milk may be a reconstituted mixture of milk proteins and milk fat. In still other embodiments, the liquid may include one or more milk substitutes such as almond milk, soy milk, etc. These milk substitutes preferable have fat and protein concentrations similar to animal milk. In still other embodiments, the liquid may include other dairy products such as yogurt. The milk used in the liquid mixture 12 may initially have any concentration of fat including approximately 1 wt. % or approximately 2 wt. % (e.g. reduced fat milks), approximately 3.25 wt. % (e.g., whole milk), approximately 10.5 wt. % to approximately 18 wt. % (e.g., "half and half"), or greater than approximately 18 wt. % (e.g., cream).

Non-dairy liquids are also suitable as the base liquid of the liquid mixture 12, such as water, coffee, or fruit juices (e.g., orange juice). The liquid mixture 12 mixture may further include other compounds such as sweeteners (e.g., sugar, honey, artificial, non-saccharide sweeteners, etc.)) and artificial or natural flavoring agents (e.g., mint, cinnamon, caramel, hazelnut, chocolate, etc.).

In an exemplary embodiment, the liquid mixture 12 is a mixture of milk or milk substitute and coffee in any suitable ratio. The coffee may be brewed using any suitable method known to one of ordinary skill in the art, including, but not limited to, espresso, drip brewing, or cold brewing. In a preferred embodiment, the coffee is cold brewed with a brew strength, measured as the percentage of total dissolved solids ranging of approximately 7 parts per million (ppm)

The cold brewed coffee is preferably mixed with whole milk at a milk to coffee weight ratio ranging from approximately 4:1 to approximately 5:1. In other words, the liquid mixture 12 preferably includes approximately 15 wt. % to approximately 25 wt. % of coffee and approximately 80 wt. % to approximately 90 wt. % milk or milk substitute. It will be understood that the sum of the weight percentages for each component of the liquid mixture 12 will not exceed 100%.

The liquid mixture 12 may be prepared by slowly mixing the gum and the base liquid until the gum is well dissolved. The base liquid and gum are preferably mixed at rate low enough to avoid dissolving air into the mixture. Where the base liquid is a mixture of liquids, the gum may be dissolved into a first liquid before a second liquid is added to the mixture. For example, for a mixture of coffee and milk, the gum may first be dissolved in the coffee. The milk is then added to the coffee-gum mixture and again slowly mixed to incorporate without dissolving air in the mixture. In other embodiments, the liquid mixture may be mixed any other order, including first mixing together the milk and the coffee and then adding the gum. In some embodiments, the liquid mixture 12 may be ultrasonicated to remove any dissolved air before or after filling the first container 10, but before sealing the first container 10.

Figure 3:
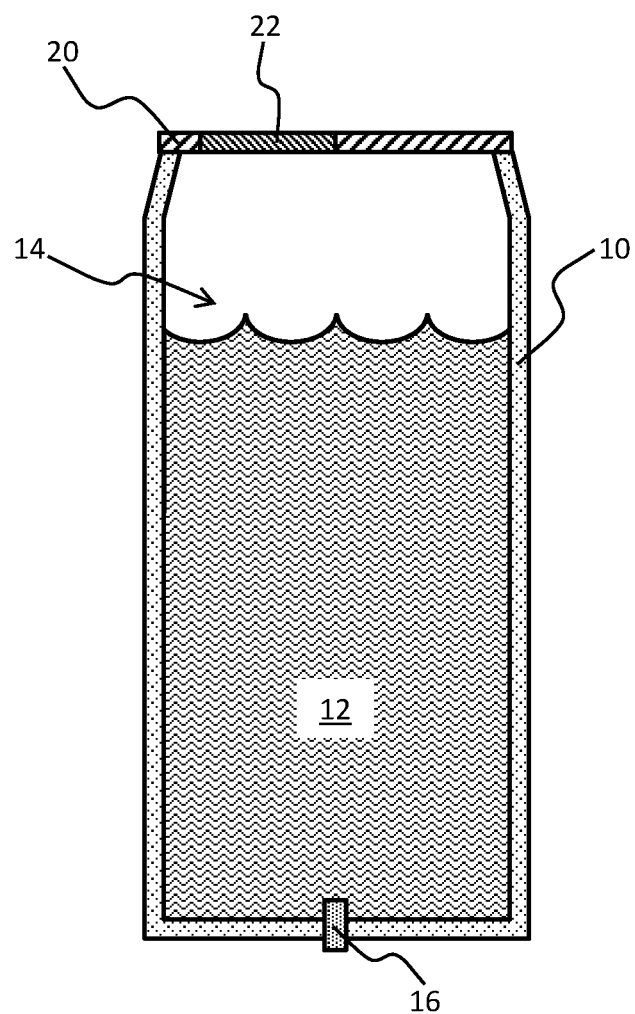
FIG. 3 is a cross-sectional view depicting sealing the first container filled with the liquid mixture of FIG. 2, according to an exemplary embodiment of the invention.

Referring now to FIG. 3, at the second step 120 of the method 100, the first container 10 is sealed with a sealing element 20. Once sealed, the first container 10 is preferably adapted to be reopened to allow the liquid mixture 12 to be dispensed from the first container 10, for example by including a scored portion 22 and a pull tab (not shown) which allows to the scored portion to be punched out from the sealing element 20. In another embodiment where the first container 10 is a bottle, the sealable element 20 may be a screw cap (not shown) which can be unscrewed to open the first container 10. In some embodiments, the one-way valve 16 may be incorporated into the sealing element 20 rather than the first container 10. Once sealed, the headspace 14 may contain air at approximately atmospheric pressure (i.e., approximately 14.7 pounds per square inch (psi) at sea level). In another embodiment, the headspace 14 may be purged of air such that the headspace 14 has a reduced pressure of less than atmospheric pressure.

Figure 4:
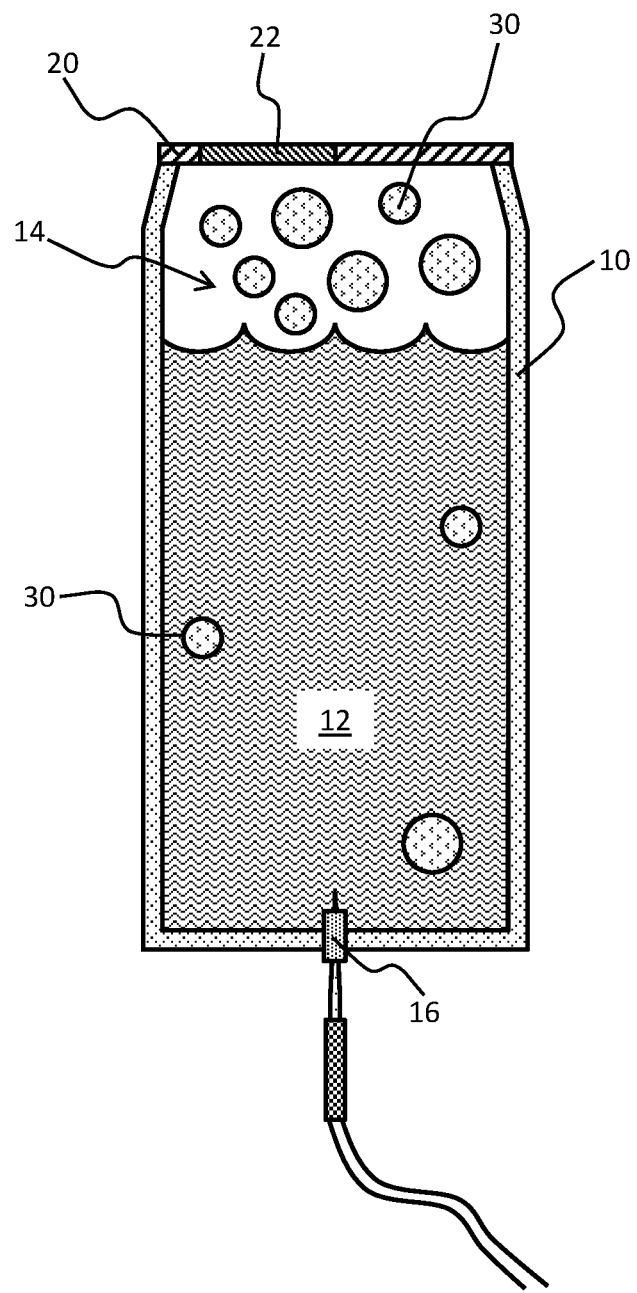
FIG. 4 is a cross-sectional view depicting introducing a volume of a gas into the sealed container of FIG. 3, according to an exemplary embodiment of the invention.

Referring now to FIG. 4, at the third step 130 of the method 100, a volume of a gas 30 is introduced into the first container 10 through one-way valve 16. In an exemplary embodiment, the first volume of the gas 30 may be introduced by inserting a syringe 32, a hollow pin, or other gas-dispensing needle through the valve 22 and injecting the gas 30 through the syringe 32 and into the headspace 14. The method of entering the gas into the first container 10 is dependent on the type of valve used and any suitable method may be used accordingly. For example, the one-way valve may be mated to a gas-dispensing valve without requiring a syringe or needle. The gas 30 is preferably nonreactive to prevent the gas 30 from altering the flavor of the liquid mixture 12. In an exemplary embodiment, the gas 30 is nitrous oxide ($N_2O$). In contrast to a nonreactive gas like nitrous oxide, carbon dioxide reacts with water to form carbonic acid. Accordingly, carbon dioxide would increase the acidity of the liquid mixture 12, leading to undesirable flavors or even curdling of the liquid mixture 12. After the gas 30 is introduced into the first container, it may naturally collect in the headspace 14 rather than being dissolved into the liquid mixture 12.

Figure 5:
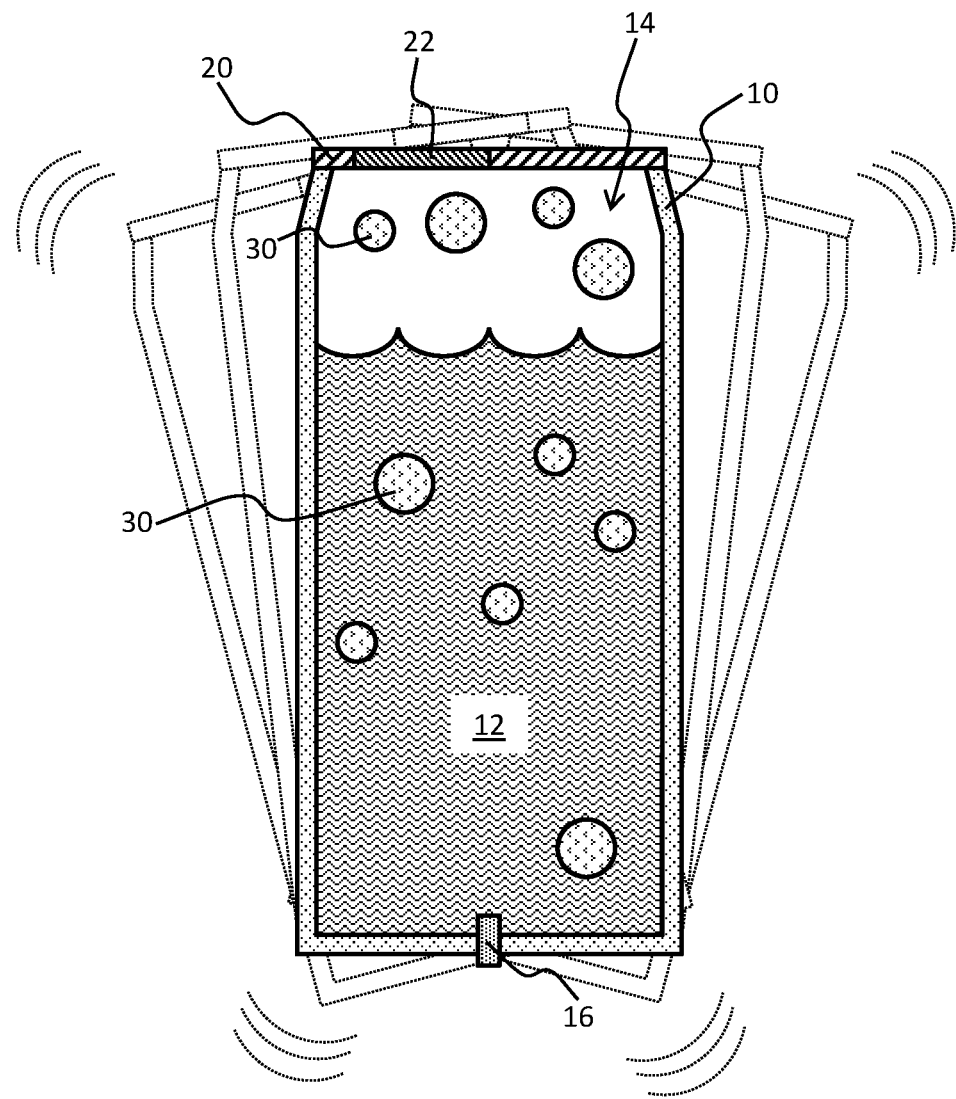
FIG. 5 is a cross-sectional view depicting agitating the sealed container of FIG. 4 while gas is introduced to dissolve the volume of gas in the liquid mixture, according to an exemplary embodiment of the invention.

Referring now to FIG. 5, at the fourth step 140 of the method 100, the first container 10 is agitated to dissolve a portion of the gas 30 in the liquid mixture 12. As the gas 30 moves from the headspace 14 into the liquid mixture 12, the pressure in the headspace 14 will be reduced. The gas is added and the first container 10 is agitated until the liquid mixture 12 is fully saturated. In one embodiment, the gas 30 is continuously added to the first container 10 while the first container 10 is agitated. In such embodiments, a commercial gasser-shaker may be used to agitate the container 10 while simultaneously introducing the gas 30. In another embodiment, the gas 30 is added in a stepwise manner, where a first portion of the gas 30 is added, and the container is agitated before a second portion of the gas 30 is added. A continuous addition of gas during simultaneous agitation is preferred. After the liquid mixture 12 is fully saturated by the gas 30, the pressure in the container 10 preferably ranges from approximately 20 psi to approximately 60 psi, and more preferably approximately 20 to 40 psi. For illustrative purposes the volume of dissolved gas inside the container 10 is depicted in FIGS. 4-5 as large circles. However, it will be understood that the gas is dissolved in the liquid mixture 12 and does not form any substantial amount of bubbles. Although a small number of bubbles may be present, the number of bubbles is substantially less than a process where the liquid mixture 12 is saturated with the gas prior to packaging. Without agitation, the gas 30 will collect in the headspace 14 rather than dissolve in the liquid mixture 12. Because undissolved gas will not form bubbles in the liquid mixture 12 once the first container 10 is opened, reducing or eliminating agitation will result in reduced foam production.

Because the amount of the gas 30 which can be dissolved in the liquid mixture 12 is dependent on the temperature of the liquid mixture 12, steps 130 and 140 preferably occur at the temperature at which the product will be stored and served to prevent too little or too much of the gas 30 being dissolved in the liquid mixture 12 during packaging. More preferably, the liquid mixture 12 has a temperature ranging from approximately 32° F. to approximately 40° F. during filling and pressurizing.

At the fifth step 150 of the method 100, the first container 10 containing the pressurized liquid mixture 12 is refrigerated until it is ready to be served. As stated above, the storage temperature preferably ranges from approximately 32° F. to approximately 40° F. In some embodiments, the first container 10 containing the pressurized liquid mixture 12 may be pasteurized prior to storage to prevent spoilage. If pasteurized, refrigeration may not be required provided that the liquid mixture 12 is cooled to approximately 32° F. to approximately 40° F. prior to serving.

Figure 6:
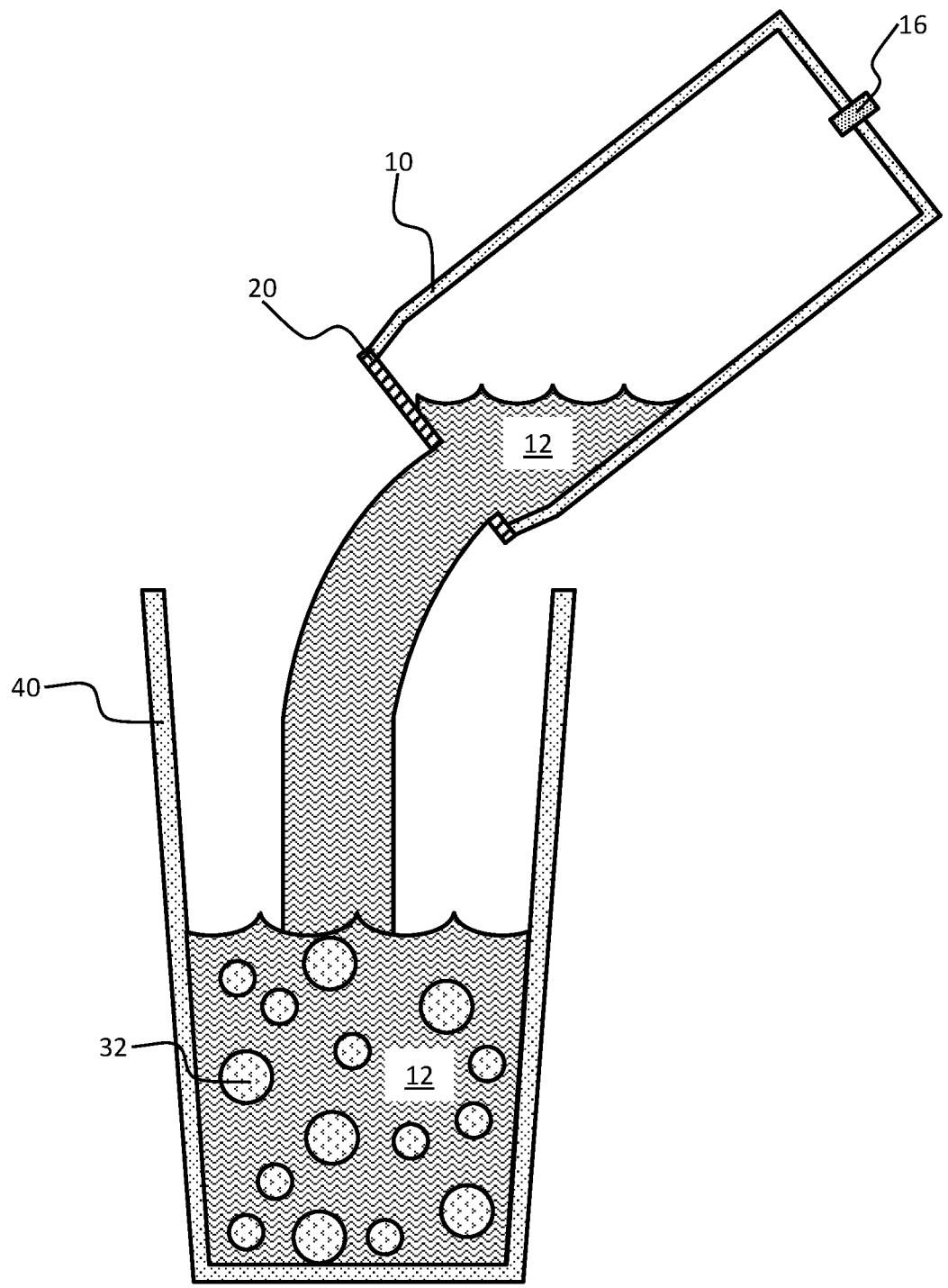
FIG. 6 is a cross-sectional view depicting pouring the gas-saturated beverage of FIG. 6 from the first container into a second container, according to an exemplary embodiment of the invention.

Referring now to FIG. 6, the pressurized liquid mixture 12 is served by opening the first container 10 and pouring the gas-saturated liquid mixture 12 into a second container 40. Because the gas-saturated liquid mixture 12 will expand in volume once poured out of the first container 10 (described in more detail below), the second container 40 preferably has a greater volume than the amount of the gas-saturated liquid mixture 12 to be poured into it. In another embodiment, the first container 10 may have a volume which is substantially larger than the volume of the liquid mixture 12, so that the expansion of the liquid mixture 12 is contained within the first container 10 once opened.

Figure 7A:
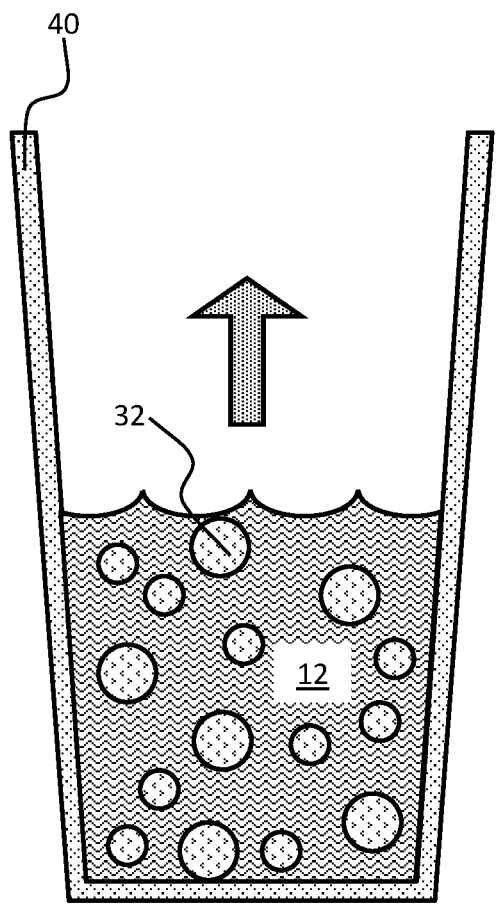
FIG. 7A is a cross-sectional view depicting the gas-saturated beverage after it has been poured into the second container of FIG. 7, according to an exemplary embodiment of the invention.
Figure 7B:
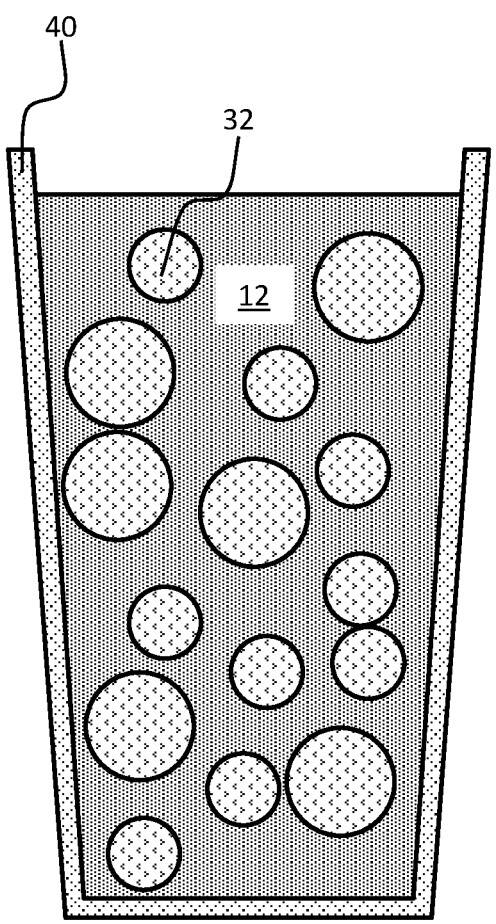
FIG. 7B is a cross-sectional view depicting the gas-saturated beverage of FIG. 7A expanding to a larger volume, according to an exemplary embodiment of the present invention

Referring now to FIGS. 7A-7B, once the gas-saturated liquid mixture 12 is poured into the second container 40, the dissolved gas 30 in the gas-saturated liquid mixture 12 will begin to exit solution and form bubbles 32, as depicted in FIG. 7A. As the bubbles 32 form, a coating including the gum will coat the bubbles 32 and prevent them from popping. Accordingly, the gum serves as a popping inhibitor and allows the resulting foam to remain stable for extended period of time. As depicted in FIG. 7B, after exiting the solution, the bubbles 32 will continue to expand increase in volume. As a result, the total volume of the liquid mixture 12 increases and the liquid mixture 12 "stretches" to take up more of the second container 40. In some cases, this stretching or expansion may take place in the first container 10 after the first container 10 is opened and therefore may not be observed in the second container 40.

Figure 8:
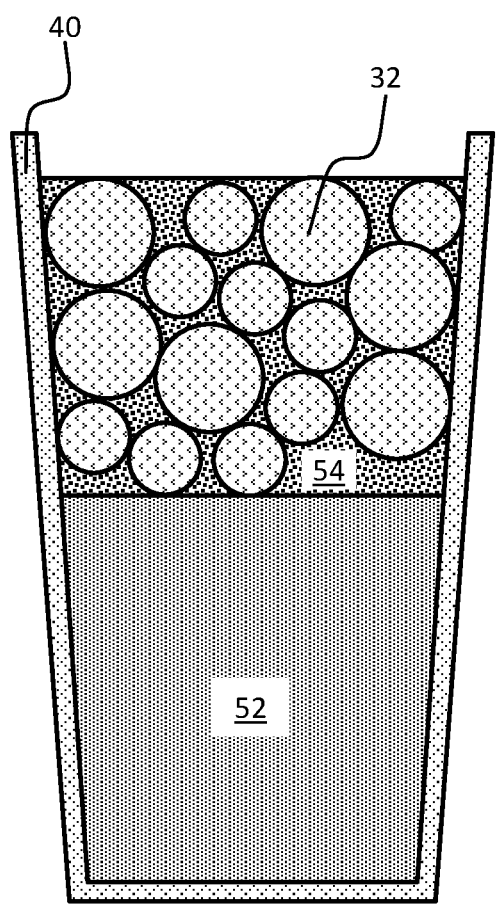
FIG. 8 is a cross-sectional view depicting the gas-saturated beverage of FIG. 7B separating into a liquid phase and a foam phase, according to an exemplary embodiment of the present invention.

Referring now to FIG. 8, as the liquid mixture 12 (FIG. 7B) is "stretched" by the gas expanding inside the bubbles 32, the bubbles 32 will begin coagulate, such that the liquid mixture 12 separates into a liquid phase 52 and a stable foam phase 54. Once the liquid mixture 12 has separated, the product is ready to be consumed. The gum in the foam phase 54 strengthens the foam such that it stable for a duration of time. The foam is stable for at least approximately 2 minutes, for at least approximately 5 minutes, for at least approximately 10 minutes, or for at least approximately 30 minutes. The foam may also remain stable after heating, for example by a microwave oven. Because the liquid mixture 12 forms both a foam phase 54 and a liquid phase 52, it is ready to be served immediately after separating rather than being mixed with a liquid beverage. Further, because the liquid mixture 12 is saturated with gas only after the first container 10 is sealed, a greater volume of foam phase 54 is formed and the foam has a silky, more desirable texture similar to the professional-grade aerated texture described above. In contrast, if the liquid mixture 12 was saturated with gas prior to packaging, the gas will begin to expand and form bubbles before it can be sealed in the package. As a result, the beverage is not as charged with gas and can only produce the hard, thin foam common to prior art products.

EXAMPLES

In the following examples, various beverages were produced by filling a 9 fluid ounce can including a one-way valve with a base liquid. In some examples, various amounts of two gums were added to the base liquid and fully mixed using a homogenizer from IKA Works, Inc. and a blender from Vita-Mix Corporation. The first gum, referred to below as "Gum A", contains acacia gum and is commercially available from Tic Gums, Inc. as Gum Arabic Spray Dry Powder. The second gum, referred to below as "Gum B" contains a mixture of acacia and xanthan gums and is also commercially available from Tic Gums, Inc. as Ticaloid 210 S Powder. Once the can is filled and sealed, a volume of nitrous oxide gas was introduced into the can through the one-way valve while agitating the can at a frequency of 9 Hz with a gasser-shaker from Gerstung Aerosol, Inc. The gassed can was then refrigerated for at least 15 minutes. The can was then opened and the contents were poured in a streamline flow into a narrow 500 mL beaker. The volume of the liquid phase and the foam phase were then measured over time. Measurements were taken at 0 seconds (i.e., immediately after the beverage is poured into the beaker), 20 seconds, 1 minute, 2 minutes, 5 minutes, 10 minutes, 15 minutes, and 30 minutes. After 30 minutes, it is expected that the beverage would have been consumed and therefore no additional measurements were taken after that time. The viscosity of the liquid phase was measured using a viscometer from Brookfield Engineering Laboratories, Inc. The diameter of the most widespread bubble size was also measured. The maximum volume of "stretch," as described above, was measured as the difference between the volume of liquid added to the can and the greatest combined volumes of the liquid phase and the foam phase.

The above experiment was conducted using six different base liquids: water (Examples 1-7), coffee (Examples 8-14), whole milk (Examples 15-21), latte (i.e., a mixture of coffee and milk) (Examples 22-28), mocha (i.e., a mixture of coffee, milk, cocoa, and sugar) (Examples 29-36), and orange juice (Examples 37-43). For each base liquid, seven different beverages were prepared. The first example for each base liquid had medium levels of gum, pressure, and agitation time. The second and third examples for each base liquid had no gum and increased gum, respectively, but were otherwise identical to the first example. The fourth and fifth examples for each base liquid had decreased and increased pressure, respectively, but were also otherwise identical to the first example. The sixth and seventh examples for each base liquid had decreased and increased agitation times, respectively, but were also otherwise identical to the first example. Additionally, two commercially available packaged coffee beverages were tested. The first commercially available canned coffee beverage, Starbucks Frappuccino (Example 44), is packaged in a glass bottle and contains no dissolved gas. The second, Java Monster from Monster Energy (Example 45), is packaged in a can and is lightly carbonated.

Example 1

Figure 9:
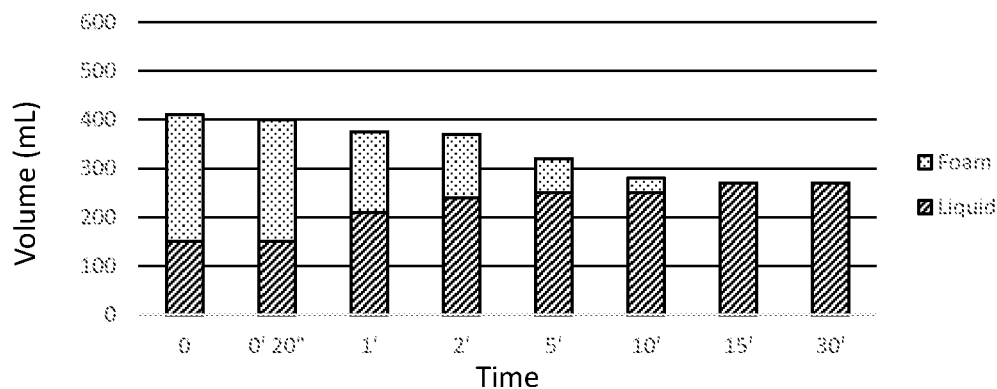
FIGS. 9-53 are graphs depicting the volumes of the foam and liquid phases of Examples 1-45 over time.

In Example 1, 265.5 g of water was mixed with 0.5 g of Gum A and 4.0 g of Gum B and added to a 9 fl. oz. can as described above. Nitrous oxide was added to the can while agitating at 9 Hz for 15 seconds. After gassing and agitating the can, the final pressure inside the can was 50 pounds per square inch (psi). The can was then opened and the beverage poured into the 500 mL beaker. The beverage separated into a liquid phase and a foam phase, which over time dissolved into the liquid phase. The foam phase persisted for 13 minutes before fully disappearing. The volume of the liquid phase and the foam phase over time is indicated below in Table 1. FIG. 9 is a graph of the volumes of the liquid phase and the foam phase of Example 1. The liquid phase had a viscosity of 350 centipoise (cP). The most widespread bubbles in the foam phase had a diameter of 1 mm. The greatest volume of the foam phase was 260 mL, and the beverage stretched to a maximum volume of 140 mL above the initial volume of the beverage.

TABLE 1

Foam Duration of Example 1

| Time | 0 sec | 20 sec | 1 min | 2 min | 5 min | 10 min | 15 min | 30 min |
|---|---|---|---|---|---|---|---|---|
| Liquid (mL) | 150 | 150 | 210 | 240 | 250 | 250 | 270 | 270 |
| Foam (mL) | 260 | 250 | 165 | 130 | 70 | 30 | 0 | 0 |

Example 2

Figure 10:
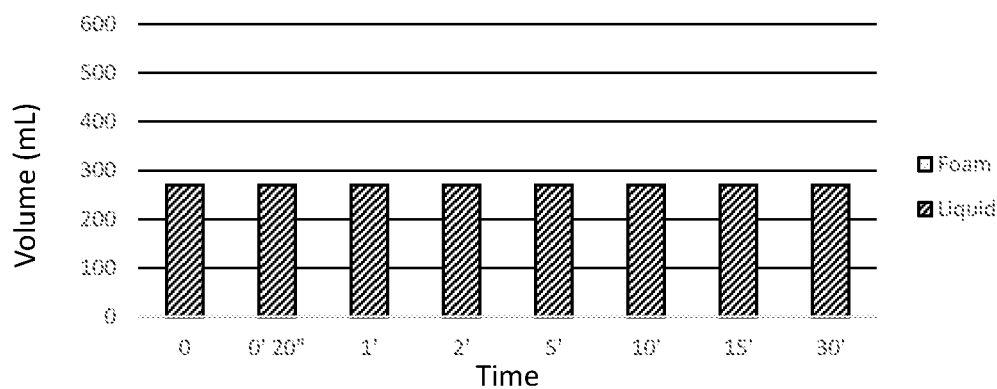

In Example 2, 270.0 g of water was added to a 9 fl. oz. can as described above without the addition of any of Gum A or Gum B. Nitrous oxide was added to the can while agitating for 15 seconds at 9 Hz. After gassing and agitating the can, the final pressure inside the can was 50 psi. The can was then opened and the beverage poured into the 500 mL beaker. No foam phase formed in the beaker, and no amount of stretch was discernible to the naked eye. The volume of the liquid phase over time is indicated below in Table 2. FIG. 10 is a graph of the volumes of the liquid phase of Example 2. The liquid phase had a viscosity of 60 cP.

TABLE 2

Foam Duration of Example 2

| Time | 0 sec | 20 sec | 1 min | 2 min | 5 min | 10 min | 15 min | 30 min |
|---|---|---|---|---|---|---|---|---|
| Liquid (mL) | 270 | 270 | 270 | 270 | 270 | 270 | 270 | 270 |
| Foam (mL) | 0 | 0 | 0 | 0 | 0 | 0 | 0 | 0 |

Example 3

Figure 11:
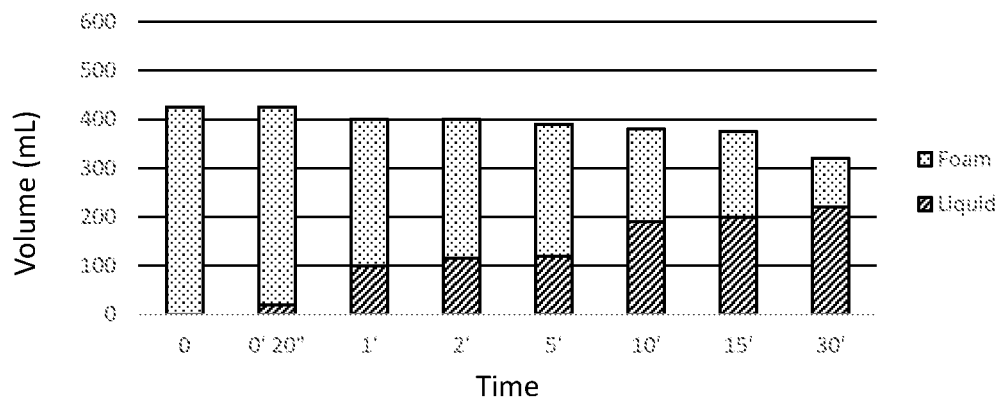

In Example 3, 261.0 g of water was mixed with 1.0 g of Gum A and 8.0 g of Gum B and added to a 9 fl. oz. can as described above. Nitrous oxide was added to the can while agitating for 15 seconds at 9 Hz. After gassing and agitating the can, the final pressure inside the can was 50 psi. The can was then opened and the beverage poured into the 500 mL beaker. The beverage separated into a liquid phase and a foam phase, which persisted for over 30 minutes. The volume of the liquid phase and the foam phase over time is indicated below in Table 3. FIG. 11 is a graph of the volumes of the liquid phase and the foam phase of Example 3. The liquid phase had a viscosity of 920 cP. The most widespread bubbles in the foam phase had a diameter of 0.3 mm. The greatest volume of the foam phase was 425 mL, and the beverage stretched to a maximum volume of 155 mL above the initial volume of the beverage.

TABLE 3

Foam Duration of Example 3

| Time | 0 sec | 20 sec | 1 min | 2 min | 5 min | 10 min | 15 min | 30 min |
|---|---|---|---|---|---|---|---|---|
| Liquid (mL) | 0 | 20 | 100 | 115 | 120 | 190 | 200 | 220 |
| Foam (mL) | 425 | 405 | 300 | 285 | 270 | 190 | 175 | 100 |

Example 4

Figure 12:
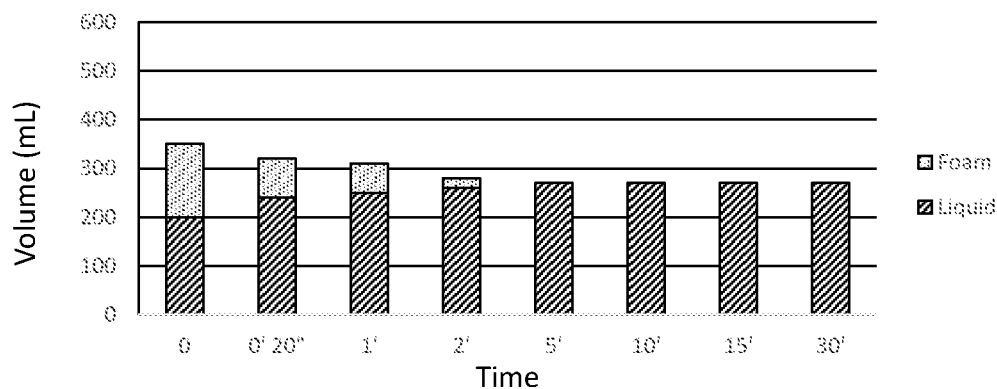

In Example 4, 265.5 g of water was mixed with 0.5 g of Gum A and 4.0 g of Gum B and added to a 9 fl. oz. can as described above. Nitrous oxide was added to the can while agitating for 15 seconds. After gassing and agitating the can, the final pressure inside the can was 20 psi. The can was then opened and the beverage poured into the 500 mL beaker. The beverage separated into a liquid phase and a foam phase, which persisted for 3 minutes. The volume of the liquid phase and the foam phase over time is indicated below in Table 4. FIG. 12 is a graph of the volumes of the liquid phase and the foam phase of Example 4. The liquid phase had a viscosity of 350 centipoise cP. The most widespread bubbles in the foam phase had a diameter of 0.1 mm. The greatest volume of the foam phase was 150 mL, and the beverage stretched to a maximum volume of 80 mL above the initial volume of the beverage.

TABLE 4

Foam Duration of Example 4

| Time | 0 sec | 20 sec | 1 min | 2 min | 5 min | 10 min | 15 min | 30 min |
|---|---|---|---|---|---|---|---|---|
| Liquid (mL) | 200 | 240 | 250 | 260 | 270 | 270 | 270 | 270 |
| Foam (mL) | 150 | 80 | 60 | 20 | 0 | 0 | 0 | 0 |

Example 5

Figure 13:
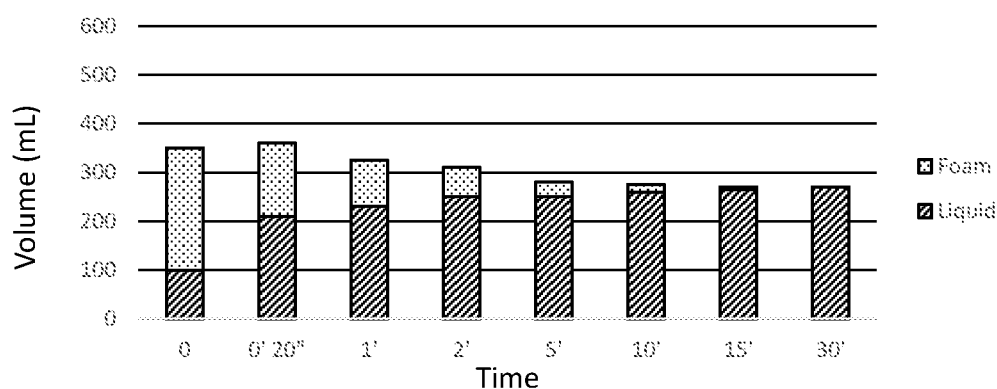

In Example 5, 265.5 g of water was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 70 psi. The can was then opened and the beverage poured into the 500 mL beaker. The beverage separated into a liquid phase and a foam phase, which persisted for 16 minutes. The volume of the liquid phase and the foam phase over time is indicated below in Table 5. FIG. 13 is a graph of the volumes of the liquid phase and the foam phase of Example 5. The liquid phase had a viscosity of 350 centipoise cP. The most widespread bubbles in the foam phase had a diameter of 2.0 mm. The greatest volume of the foam phase was 250 mL, and the beverage stretched to a maximum volume of 90 mL above the initial volume of the beverage.

TABLE 5

Foam Duration of Example 5

| Time | 0 sec | 20 sec | 1 min | 2 min | 5 min | 10 min | 15 min | 30 min |
|---|---|---|---|---|---|---|---|---|
| Liquid (mL) | 100 | 210 | 230 | 250 | 250 | 260 | 265 | 270 |
| Foam (mL) | 250 | 150 | 95 | 60 | 30 | 15 | 5 | 0 |

Example 6

Figure 14:
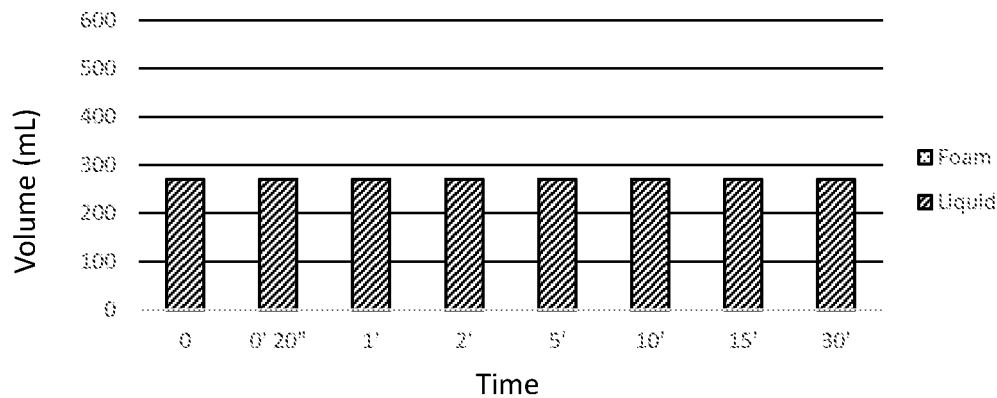

In Example 6, 265.5 g of water was mixed with 0.5 g of Gum A and 4.0 g of Gum B and added to a 9 fl. oz. can as described above. Nitrous oxide was added to the can while agitating for 2 seconds. After gassing and agitating the can, the final pressure inside the can was 50 psi. The can was then opened and the beverage poured into the 500 mL beaker. No foam phase formed in the beaker. The volume of the liquid phase over time is indicated below in Table 6. FIG. 14 is a graph of the volumes of the liquid phase and the foam phase of Example 6. The liquid phase had a viscosity of 350 cP.

TABLE 6

Foam Duration of Example 6

| Time | 0 sec | 20 sec | 1 min | 2 min | 5 min | 10 min | 15 min | 30 min |
|---|---|---|---|---|---|---|---|---|
| Liquid (mL) | 270 | 270 | 270 | 270 | 270 | 270 | 270 | 270 |
| Foam (mL) | 0 | 0 | 0 | 0 | 0 | 0 | 0 | 0 |

Example 7

Figure 15:
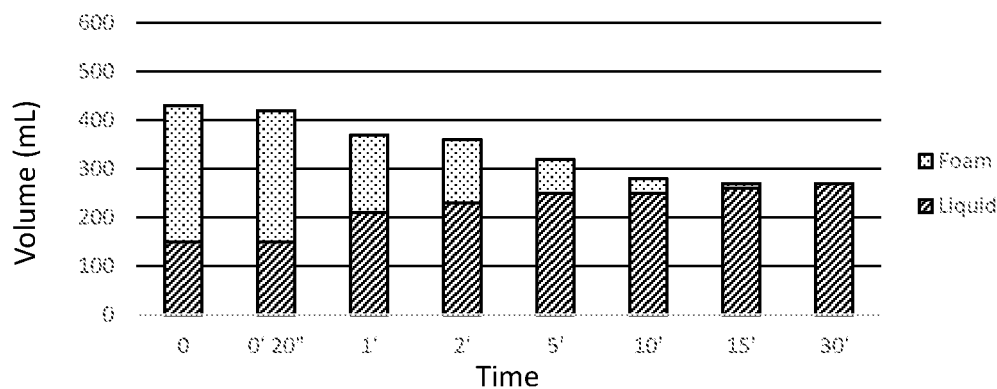

In Example 7, 265.5 g of water was mixed with 0.5 g of Gum A and 4.0 g of Gum B and added to a 9 fl. oz. can as described above. Nitrous oxide was added to the can while agitating for 30 seconds at 9 Hz. After gassing and agitating the can, the final pressure inside the can was 50 psi. The can was then opened and the beverage poured into the 500 mL beaker. The beverage separated into a liquid phase and a foam phase, which persisted for 18 minutes. The volume of the liquid phase and the foam phase over time is indicated below in Table 7. FIG. 15 is a graph of the volumes of the liquid phase and the foam phase of Example 7. The liquid phase had a viscosity of 350 centipoise cP. The most widespread bubbles in the foam phase had a diameter of 1.0 mm. The greatest volume of the foam phase was 280 mL, and the beverage stretched to a maximum volume of 160 mL above the initial volume of the beverage.

TABLE 7

Foam Duration of Example 7

| Time | 0 sec | 20 sec | 1 min | 2 min | 5 min | 10 min | 15 min | 30 min |
|---|---|---|---|---|---|---|---|---|
| Liquid (mL) | 150 | 150 | 210 | 230 | 250 | 250 | 260 | 270 |
| Foam (mL) | 280 | 270 | 160 | 130 | 70 | 30 | 10 | 0 |

Example 8

Figure 16:
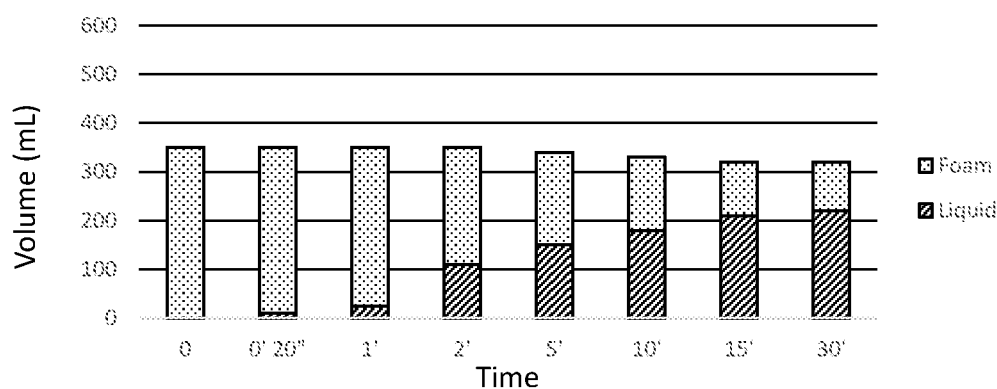

In Example 8, 265.5 g of coffee was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for more than 30 minutes. The volume of the liquid phase and the foam phase over time is indicated below in Table 8. FIG. 16 is a graph of the volumes of the liquid phase and the foam phase of Example 8. The liquid phase had a viscosity of 1620 centipoise cP. The most widespread bubbles in the foam phase had a diameter of 0.2 mm. The greatest volume of the foam phase was 350 mL, and the beverage stretched to a maximum volume of 80 mL above the initial volume of the beverage.

TABLE 8

Foam Duration of Example 8

| Time | 0 sec | 20 sec | 1 min | 2 min | 5 min | 10 min | 15 min | 30 min |
|---|---|---|---|---|---|---|---|---|
| Liquid (mL) | 0 | 10 | 25 | 110 | 150 | 180 | 210 | 220 |
| Foam (mL) | 350 | 340 | 325 | 240 | 190 | 150 | 110 | 100 |

Example 9

Figure 17:
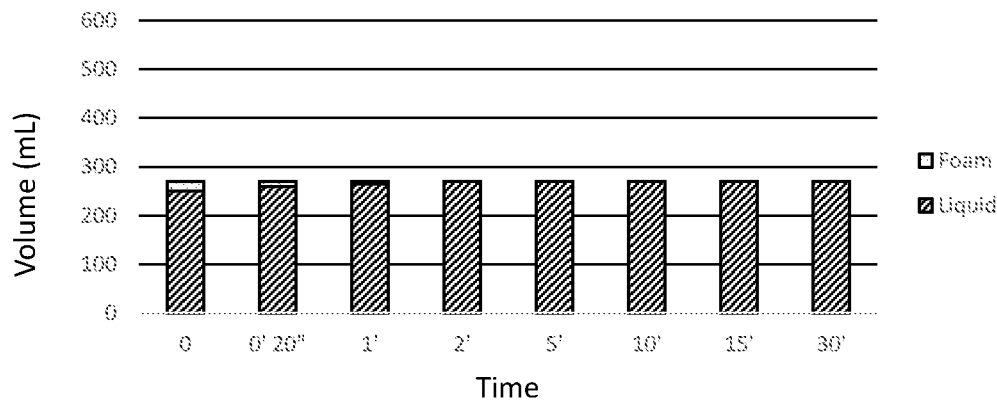

In Example 9, 270.0 g of coffee was added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for only 2 minutes. The volume of the liquid phase and the foam phase over time is indicated below in Table 9. FIG. 17 is a graph of the volumes of the liquid phase and the foam phase of Example 9. The liquid phase had a viscosity of 90 cP. The most widespread bubbles in the foam phase had a diameter of 2.0 mm. The greatest volume of the foam phase was 20 mL, and no amount of stretch was discernible to the naked eye.

TABLE 9

Foam Duration of Example 9

| Time | 0 sec | 20 sec | 1 min | 2 min | 5 min | 10 min | 15 min | 30 min |
|---|---|---|---|---|---|---|---|---|
| Liquid (mL) | 250 | 260 | 265 | 270 | 270 | 270 | 270 | 270 |
| Foam (mL) | 20 | 10 | 5 | 0 | 0 | 0 | 0 | 0 |

Example 10

Figure 18:
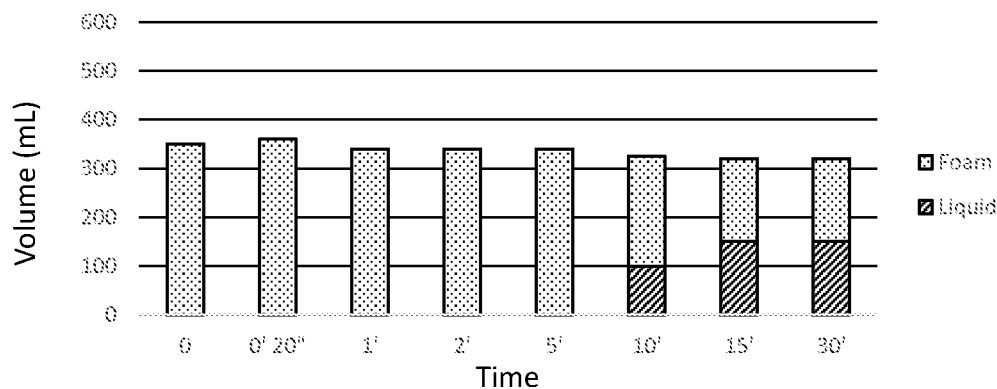

In Example 10, 261.0 g of coffee was mixed with 1.0 g of Gum A and 8.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 10. FIG. 18 is a graph of the volumes of the liquid phase and the foam phase of Example 10. The liquid phase had a viscosity of 5479 cP. The most widespread bubbles in the foam phase had a diameter of 2.0 mm. The greatest volume of the foam phase was 360 mL, and the beverage stretched to a maximum volume of 90 mL above the initial volume of the beverage.

TABLE 10

Foam Duration of Example 10

| Time | 0 sec | 20 sec | 1 min | 2 min | 5 min | 10 min | 15 min | 30 min |
|---|---|---|---|---|---|---|---|---|
| Liquid (mL) | 0 | 0 | 0 | 0 | 0 | 100 | 150 | 150 |
| Foam (mL) | 350 | 360 | 340 | 340 | 340 | 225 | 170 | 170 |

Example 11

Figure 19:
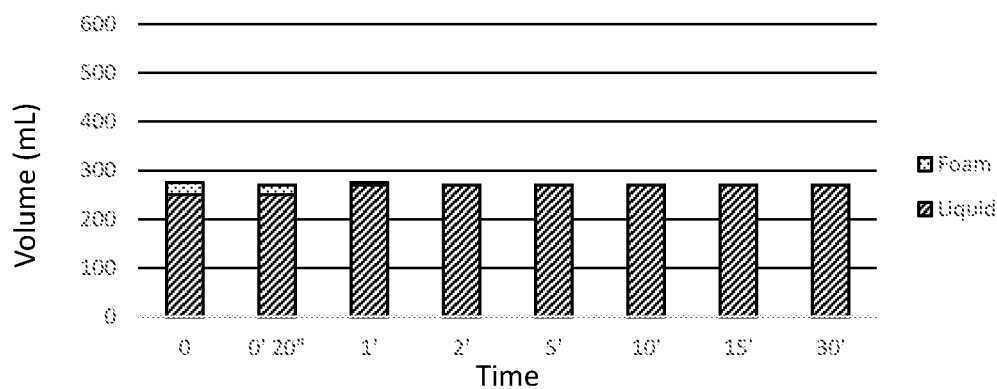

In Example 11, 265.5 g of coffee was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 20 psi. The can was then opened and the beverage poured into the 500 mL beaker. The beverage separated into a liquid phase and a foam phase, which persisted for only 1 minute. The volume of the liquid phase and the foam phase over time is indicated below in Table 11. FIG. 19 is a graph of the volumes of the liquid phase and the foam phase of Example 11. The liquid phase had a viscosity of 1620 cP. The most widespread bubbles in the foam phase had a diameter of 0.05 mm. The greatest volume of the foam phase was 25 mL, and the beverage stretched to a maximum volume of 5 mL above the initial volume of the beverage.

TABLE 11

Foam Duration of Example 11

| Time | 0 sec | 20 sec | 1 min | 2 min | 5 min | 10 min | 15 min | 30 min |
|---|---|---|---|---|---|---|---|---|
| Liquid (mL) | 250 | 250 | 270 | 270 | 270 | 270 | 270 | 270 |
| Foam (mL) | 25 | 20 | 5 | 0 | 0 | 0 | 0 | 0 |

Example 12

Figure 20:
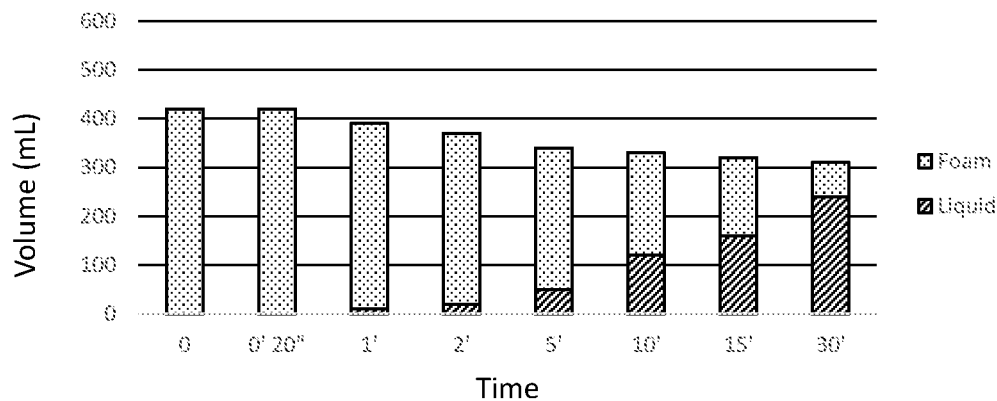

In Example 12, 265.5 g of coffee was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 65 psi. The can was then opened and the beverage poured into the 500 mL beaker. The beverage separated into a liquid phase and a foam phase, which persisted for over 30 minutes. The volume of the liquid phase and the foam phase over time is indicated below in Table 12. FIG. 20 is a graph of the volumes of the liquid phase and the foam phase of Example 12. The liquid phase had a viscosity of 1620 cP. The most widespread bubbles in the foam phase had a diameter of 2.0 mm. The greatest volume of the foam phase was 420 mL, and the beverage stretched to a maximum volume of 150 mL above the initial volume of the beverage.

TABLE 12

Foam Duration of Example 12

| Time | 0 sec | 20 sec | 1 min | 2 min | 5 min | 10 min | 15 min | 30 min |
|---|---|---|---|---|---|---|---|---|
| Liquid (mL) | 0 | 0 | 10 | 20 | 50 | 120 | 160 | 240 |
| Foam (mL) | 420 | 420 | 380 | 350 | 290 | 210 | 160 | 70 |

Example 13

Figure 21:
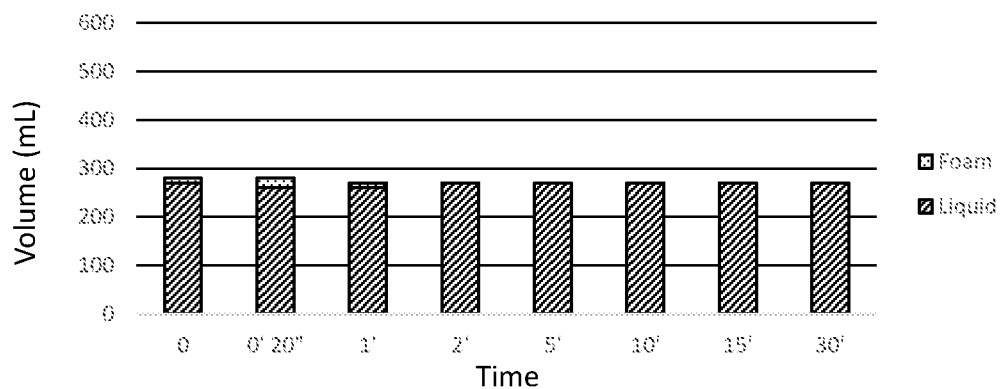

In Example 13, 265.5 g of coffee was mixed with 0.5 g of Gum A and 4.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. The beverage separated into a liquid phase and a foam phase, which persisted for only 1 minute. The volume of the liquid phase and the foam phase over time is indicated below in Table 13. FIG. 21 is a graph of the volumes of the liquid phase and the foam phase of Example 13. The liquid phase had a viscosity of 1620 cP. The most widespread bubbles in the foam phase had a diameter of 0.05 mm. The greatest volume of the foam phase was 20 mL, and the beverage stretched to a maximum volume of 10 mL above the initial volume of the beverage.

TABLE 13

Foam Duration of Example 13

| Time | 0 sec | 20 sec | 1 min | 2 min | 5 min | 10 min | 15 min | 30 min |
|---|---|---|---|---|---|---|---|---|
| Liquid (mL) | 270 | 260 | 260 | 270 | 270 | 270 | 270 | 270 |
| Foam (mL) | 10 | 20 | 10 | 0 | 0 | 0 | 0 | 0 |

Example 14

Figure 22:
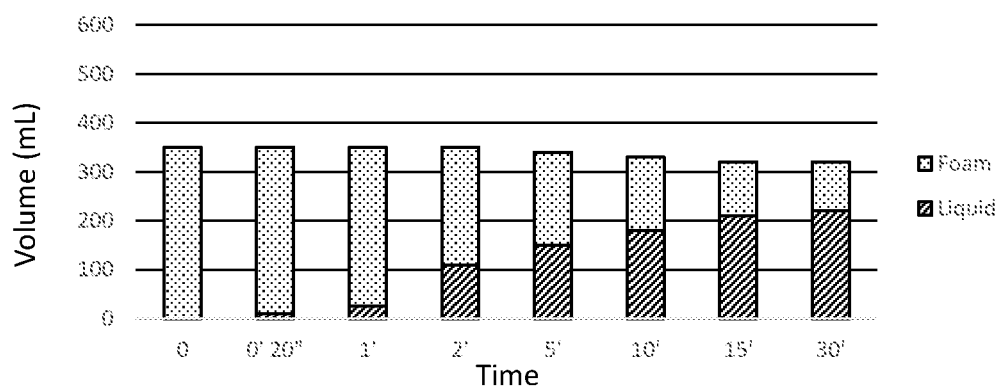

In Example 14, 265.5 g of coffee was mixed with 0.5 g of Gum A and 4.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 14. FIG. 22 is a graph of the volumes of the liquid phase and the foam phase of Example 14. The liquid phase had a viscosity of 1620 cP. The most widespread bubbles in the foam phase had a diameter of 2.0 mm. The greatest volume of the foam phase was 350 mL, and the beverage stretched to a maximum volume of 80 mL above the initial volume of the beverage.

TABLE 14

Foam Duration of Example 14

| Time | 0 sec | 20 sec | 1 min | 2 min | 5 min | 10 min | 15 min | 30 min |
|---|---|---|---|---|---|---|---|---|
| Liquid (mL) | 0 | 10 | 25 | 110 | 150 | 180 | 210 | 220 |
| Foam (mL) | 350 | 340 | 325 | 240 | 190 | 150 | 110 | 100 |

Example 15

Figure 23:
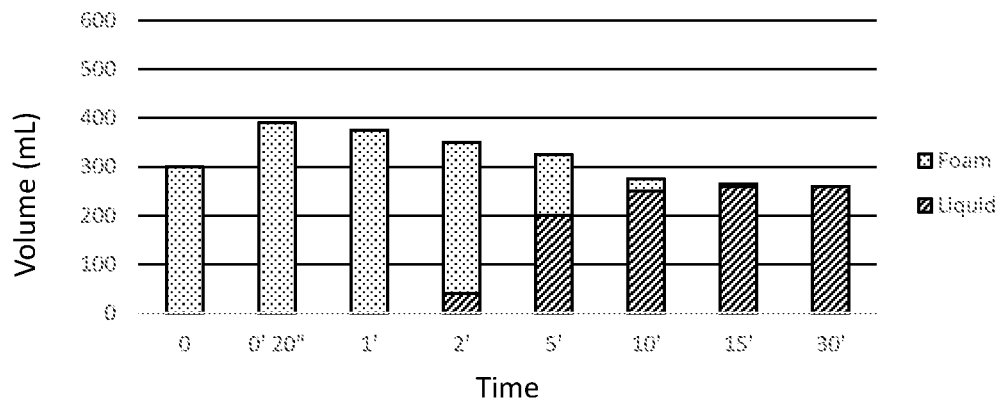

In Example 15, 266.6 g of whole milk was mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 23 minutes. The volume of the liquid phase and the foam phase over time is indicated below in Table 15. FIG. 23 is a graph of the volumes of the liquid phase and the foam phase of Example 15. The liquid phase had a viscosity of 360 cP. The most widespread bubbles in the foam phase had a diameter of 0.1 mm. The greatest volume of the foam phase was 390 mL, and the beverage stretched to a maximum volume of 120 mL above the initial volume of the beverage.

TABLE 15

| | Foam Duration of Example 15 | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 0 | 0 | 40 | 200 | 250 | 260 | 260 |
| Foam (mL) | 300 | 390 | 375 | 310 | 125 | 25 | 5 | 0 |

Example 16

Figure 24:
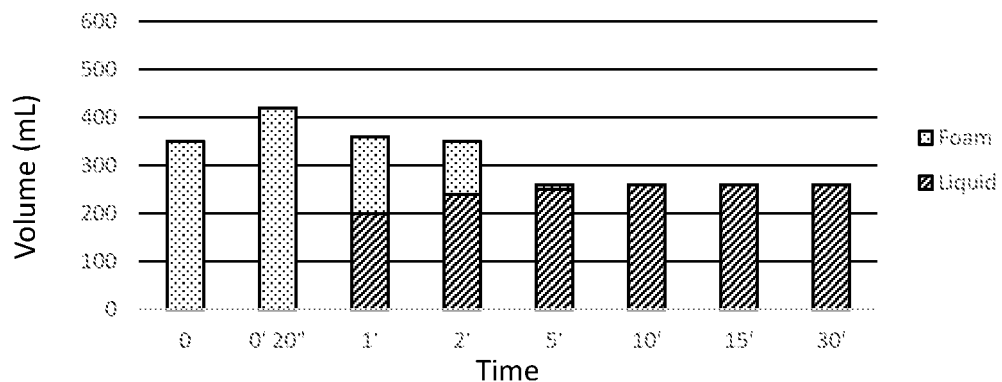

In Example 16, 270.0 g of whole milk was added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 6 minutes. The volume of the liquid phase and the foam phase over time is indicated below in Table 16. FIG. 24 is a graph of the volumes of the liquid phase and the foam phase of Example 16. The liquid phase had a viscosity of 80 cP. The most widespread bubbles in the foam phase had a diameter of 0.15 mm. The greatest volume of the foam phase was 420 mL, and the beverage stretched to a maximum volume of 150 mL above the initial volume of the beverage.

TABLE 16

| | Foam Duration of Example 16 | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 0 | 200 | 240 | 250 | 260 | 260 | 260 |
| Foam (mL) | 350 | 420 | 160 | 110 | 10 | 0 | 0 | 0 |

Example 17

Figure 25:
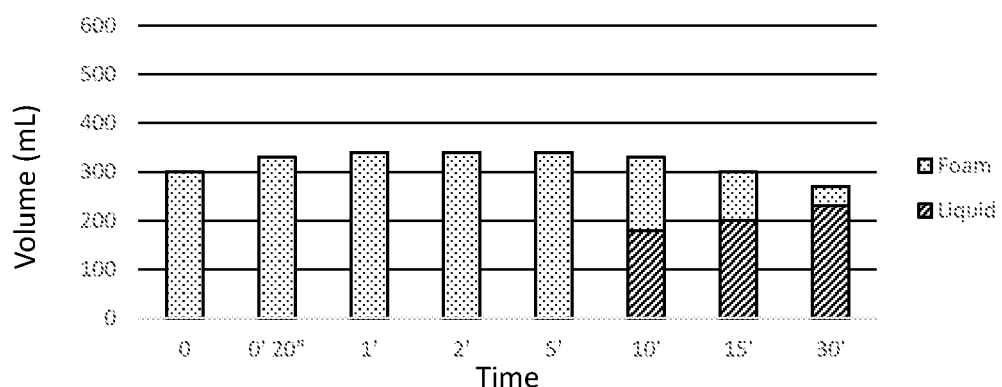

In Example 17, 263.2 g of whole milk was mixed with 0.8 g of Gum A and 6.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 17. FIG. 25 is a graph of the volumes of the liquid phase and the foam phase of Example 17. The liquid phase had a viscosity of 1150 cP. The most widespread bubbles in the foam phase had a diameter of 0.075 mm. The greatest volume of the foam phase was 340 mL, and the beverage stretched to a maximum volume of 70 mL above the initial volume of the beverage.

TABLE 17

| | Foam Duration of Example 17 | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 0 | 0 | 0 | 0 | 180 | 200 | 230 |
| Foam (mL) | 300 | 330 | 340 | 340 | 340 | 150 | 100 | 40 |

Example 18

Figure 26:
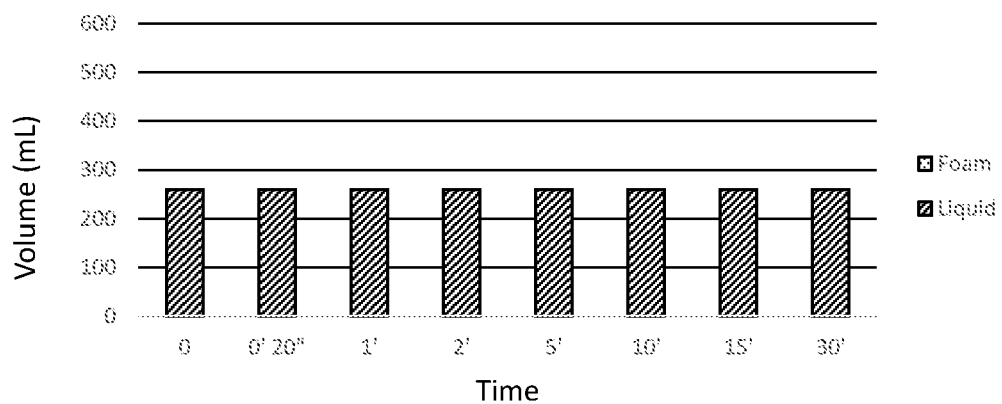

In Example 18, 266.6 g of whole milk was mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 10 psi. The can was then opened and the beverage poured into the 500 mL beaker. No foam phase formed in the beaker, and no amount of stretch was discernible to the naked eye. The volume of the liquid phase over time is indicated below in Table 18. FIG. 26 is a graph of the volumes of the liquid phase of Example 18. The liquid phase had a viscosity of 360 cP.

TABLE 18

Foam Duration of Example 18

| Time | 0 sec | 20 sec | 1 min | 2 min | 5 min | 10 min | 15 min | 30 min |
|---|---|---|---|---|---|---|---|---|
| Liquid (mL) | 260 | 260 | 260 | 260 | 260 | 260 | 260 | 260 |
| Foam (mL) | 0 | 0 | 0 | 0 | 0 | 0 | 0 | 0 |

Example 19

Figure 27:
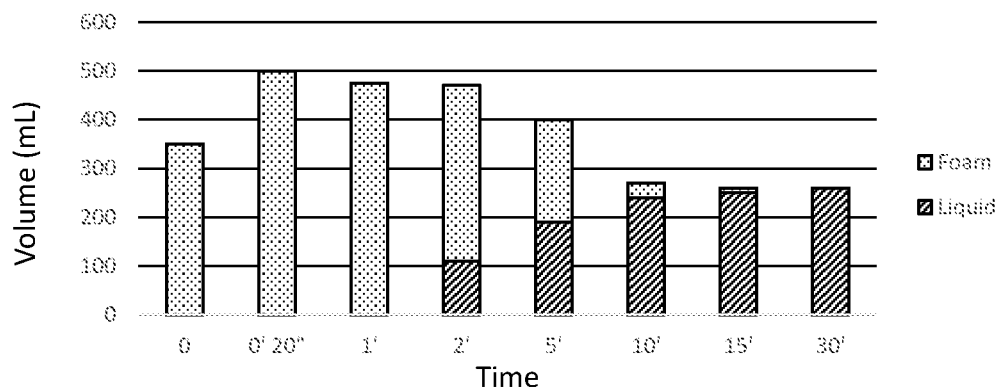

In Example 19, 266.6 g of whole milk was mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for 21 minutes. The volume of the liquid phase and the foam phase over time is indicated below in Table 19. FIG. 27 is a graph of the volumes of the liquid phase and the foam phase of Example 19. The liquid phase had a viscosity of 360 cP. The most widespread bubbles in the foam phase had a diameter of 0.5 mm. The greatest volume of the foam phase was 500 mL, and the beverage stretched to a maximum volume of 230 mL above the initial volume of the beverage.

TABLE 19

Foam Duration of Example 19

| Time | 0 sec | 20 sec | 1 min | 2 min | 5 min | 10 min | 15 min | 30 min |
|---|---|---|---|---|---|---|---|---|
| Liquid (mL) | 0 | 0 | 0 | 110 | 190 | 240 | 250 | 260 |
| Foam (mL) | 350 | 500 | 475 | 360 | 210 | 30 | 10 | 0 |

Example 20

Figure 28:
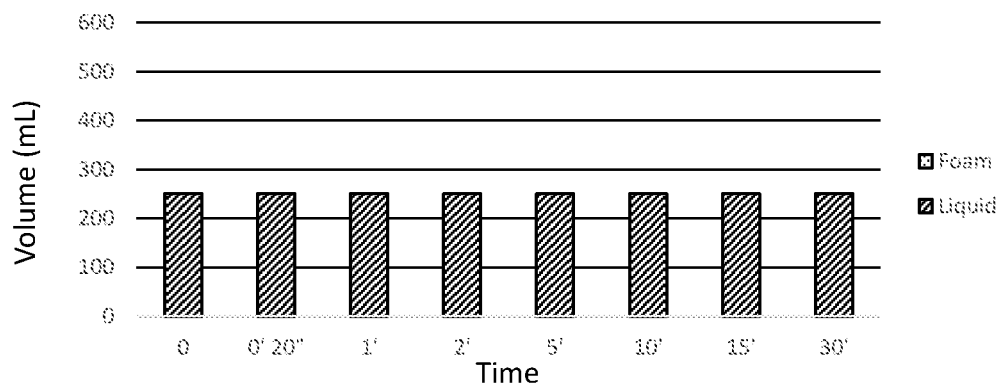

In Example 20, 266.6 g of whole milk was mixed with 0.4 g of Gum A and 3.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. No foam phase formed in the beaker, and no amount of stretch was discernible to the naked eye. The volume of the liquid phase over time is indicated below in Table 20. FIG. 28 is a graph of the volumes of the liquid phase of Example 20. The liquid phase had a viscosity of 360 cP.

TABLE 20

Foam Duration of Example 20

| Time | 0 sec | 20 sec | 1 min | 2 min | 5 min | 10 min | 15 min | 30 min |
|---|---|---|---|---|---|---|---|---|
| Liquid (mL) | 250 | 250 | 250 | 250 | 250 | 250 | 250 | 250 |
| Foam (mL) | 0 | 0 | 0 | 0 | 0 | 0 | 0 | 0 |

Example 21

Figure 29:
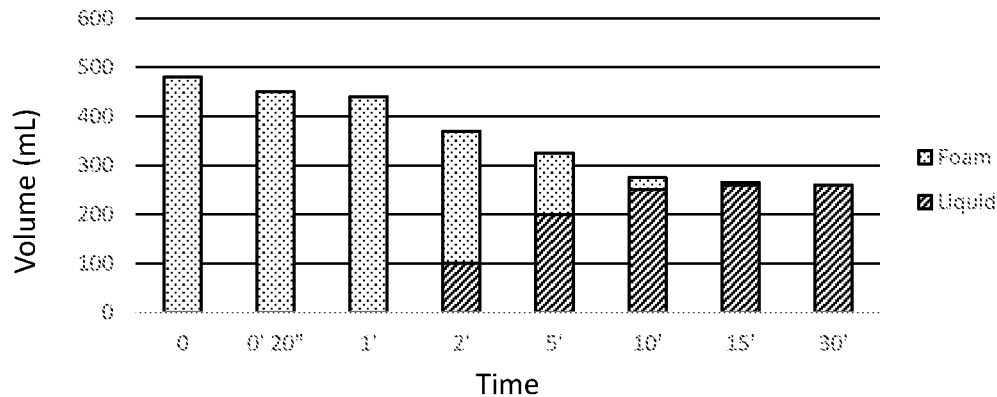

In Example 21, 266.6 g of whole milk was mixed with 0.4 g of Gum A and 3.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for 22 minutes. The volume of the liquid phase and the foam phase over time is indicated below in Table 21. FIG. 29 is a graph of the volumes of the liquid phase and the foam phase of Example 21. The liquid phase had a viscosity of 360 cP. The most widespread bubbles in the foam phase had a diameter of 0.1 mm. The greatest volume of the foam phase was 480 mL, and the beverage stretched to a maximum volume of 210 mL above the initial volume of the beverage.

TABLE 21

| Foam Duration of Example 21 | | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 0 | 0 | 100 | 200 | 250 | 260 | 260 |
| Foam (mL) | 480 | 450 | 440 | 270 | 125 | 25 | 5 | 0 |

Example 22

Figure 30:
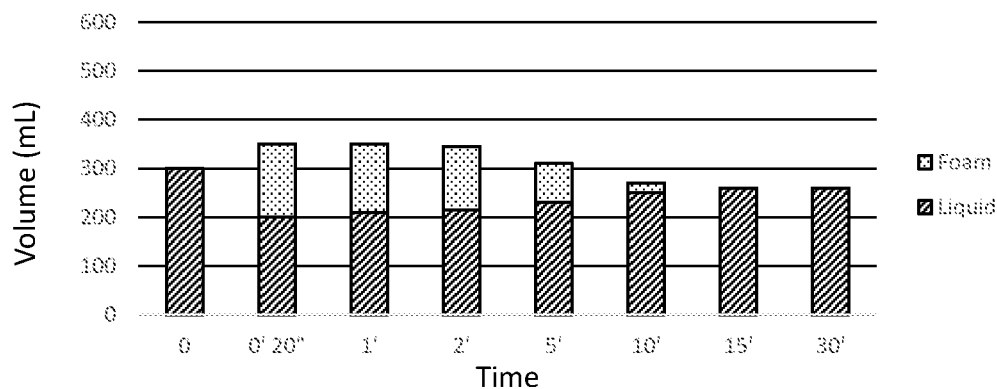

In Example 22, 230.6 g of whole milk and 36.0 g of coffee were mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 14 minutes. The volume of the liquid phase and the foam phase over time is indicated below in Table 22. FIG. 30 is a graph of the volumes of the liquid phase and the foam phase of Example 22. The liquid phase had a viscosity of 750 cP. The most widespread bubbles in the foam phase had a diameter of 0.1 mm. The greatest volume of the foam phase was 150 mL, and the beverage stretched to a maximum volume of 80 mL above the initial volume of the beverage.

TABLE 22

| Foam Duration of Example 22 | | | | | | | | |
|---|---|---|---|---|---|---|---|---|
| Time | 0 sec | 20 sec | 1 min | 2 min | 5 min | 10 min | 15 min | 30 min |
| Liquid (mL) | 300 | 200 | 210 | 215 | 230 | 250 | 260 | 260 |
| Foam (mL) | 0 | 150 | 140 | 130 | 80 | 20 | 0 | 0 |

Example 23

Figure 31:
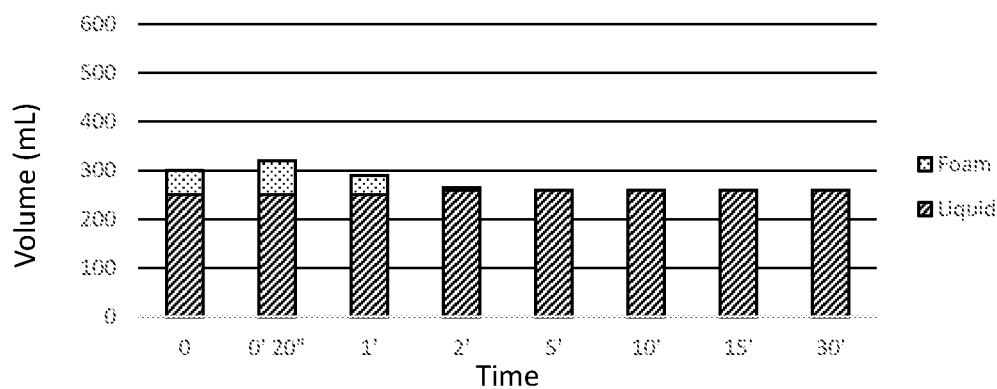

In Example 23, 233.0 g of whole milk and 37.0 g of coffee were added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for only 3 minutes. The volume of the liquid phase and the foam phase over time is indicated below in Table 23. FIG. 31 is a graph of the volumes of the liquid phase and the foam phase of Example 23. The liquid phase had a viscosity of 120 cP. The most widespread bubbles in the foam phase had a diameter of 0.1 mm. The greatest volume of the foam phase was 70 mL, and the beverage stretched to a maximum volume of 50 mL above the initial volume of the beverage.

TABLE 23

Foam Duration of Example 23

| Time | 0 sec | 20 sec | 1 min | 2 min | 5 min | 10 min | 15 min | 30 min |
|---|---|---|---|---|---|---|---|---|
| Liquid (mL) | 250 | 250 | 250 | 260 | 260 | 260 | 260 | 260 |
| Foam (mL) | 50 | 70 | 40 | 5 | 0 | 0 | 0 | 0 |

Example 24

Figure 32:
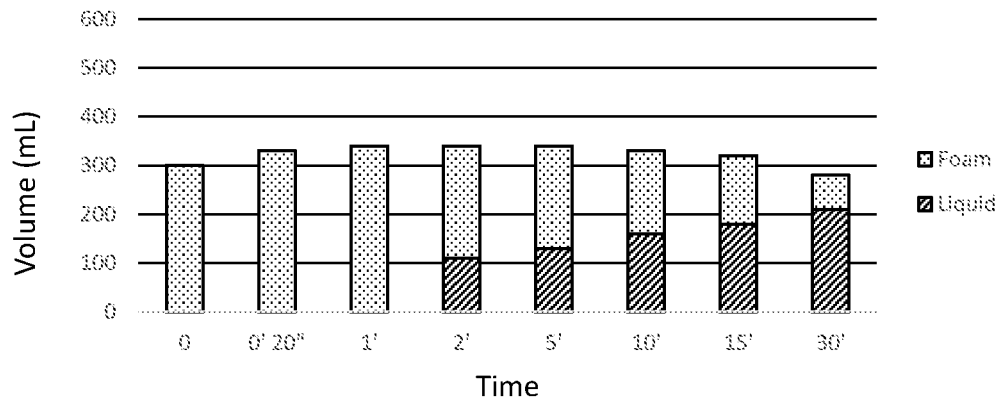

In Example 24, 228.2 g of whole milk and 35.0 g of coffee were mixed with 0.8 g of Gum A and 6.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 24. FIG. 32 is a graph of the volumes of the liquid phase and the foam phase of Example 24. The liquid phase had a viscosity of 2539 cP. The most widespread bubbles in the foam phase had a diameter of 0.05 mm. The greatest volume of the foam phase was 340 mL, and the beverage stretched to a maximum volume of 70 mL above the initial volume of the beverage.

TABLE 24

Foam Duration of Example 24

| Time | 0 sec | 20 sec | 1 min | 2 min | 5 min | 10 min | 15 min | 30 min |
|---|---|---|---|---|---|---|---|---|
| Liquid (mL) | 0 | 0 | 0 | 110 | 130 | 160 | 180 | 210 |
| Foam (mL) | 300 | 330 | 340 | 230 | 210 | 170 | 140 | 70 |

Example 25

Figure 33:
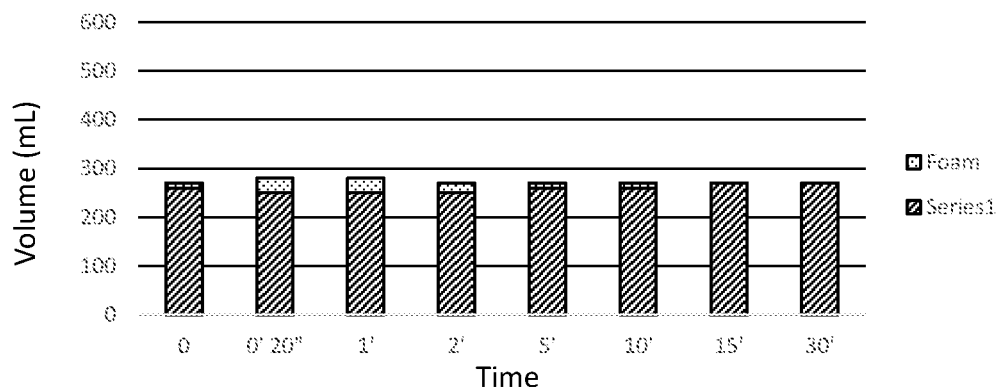

In Example 25, 230.6 g of whole milk and 36.0 g of coffee were mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 20 psi. The can was then opened and the beverage poured into the 500 mL beaker. The beverage separated into a liquid phase and a foam phase, which persisted for 13 minutes. The volume of the liquid phase and the foam phase over time is indicated below in Table 25. FIG. 33 is a graph of the volumes of the liquid phase and the foam phase of Example 25. The liquid phase had a viscosity of 750 cP. The most widespread bubbles in the foam phase had a diameter of 0.15 mm. The greatest volume of the foam phase was 30 mL, and the beverage stretched to a maximum volume of 10 mL above the initial volume of the beverage.

TABLE 25

Foam Duration of Example 25

| Time | 0 sec | 20 sec | 1 min | 2 min | 5 min | 10 min | 15 min | 30 min |
|---|---|---|---|---|---|---|---|---|
| Liquid (mL) | 260 | 250 | 250 | 250 | 260 | 260 | 270 | 270 |
| Foam (mL) | 10 | 30 | 30 | 20 | 10 | 10 | 0 | 0 |

Example 26

Figure 34:
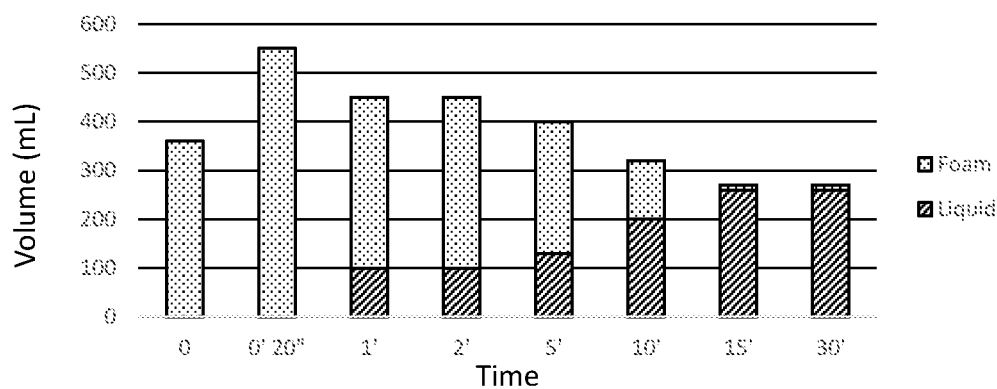

In Example 26, 230.6 g of whole milk and 36.0 g of coffee were mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for over 30 minutes. The volume of the liquid phase and the foam phase over time is indicated below in Table 26. FIG. 34 is a graph of the volumes of the liquid phase and the foam phase of Example 26. The liquid phase had a viscosity of 750 cP. The most widespread bubbles in the foam phase had a diameter of 0.1 mm. The greatest volume of the foam phase was 550 mL, and the beverage stretched to a maximum volume of 280 mL above the initial volume of the beverage.

TABLE 26

Foam Duration of Example 26

| Time | 0 sec | 20 sec | 1 min | 2 min | 5 min | 10 min | 15 min | 30 min |
|---|---|---|---|---|---|---|---|---|
| Liquid (mL) | 0 | 0 | 100 | 100 | 130 | 200 | 260 | 260 |
| Foam (mL) | 360 | 550 | 350 | 350 | 270 | 120 | 10 | 10 |

Example 27

Figure 35:
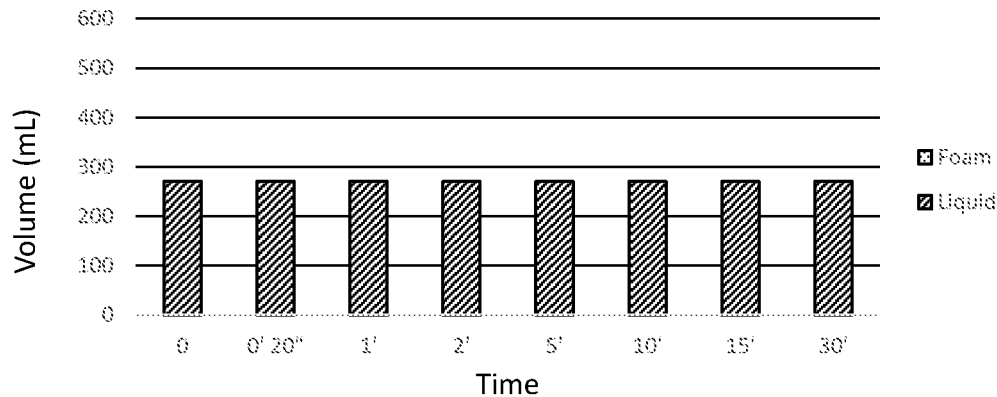

In Example 27, 230.6 g of whole milk and 36.0 g of coffee were mixed with 0.4 g of Gum A and 3.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. No foam phase formed in the beaker, and no amount of stretch was discernible to the naked eye. The volume of the liquid phase over time is indicated below in Table 27. FIG. 35 is a graph of the volumes of the liquid phase of Example 27. The liquid phase had a viscosity of 750 cP.

TABLE 27

Foam Duration of Example 27

| Time | 0 sec | 20 sec | 1 min | 2 min | 5 min | 10 min | 15 min | 30 min |
|---|---|---|---|---|---|---|---|---|
| Liquid (mL) | 270 | 270 | 270 | 270 | 270 | 270 | 270 | 270 |
| Foam (mL) | 0 | 0 | 0 | 0 | 0 | 0 | 0 | 0 |

Example 28

Figure 36:
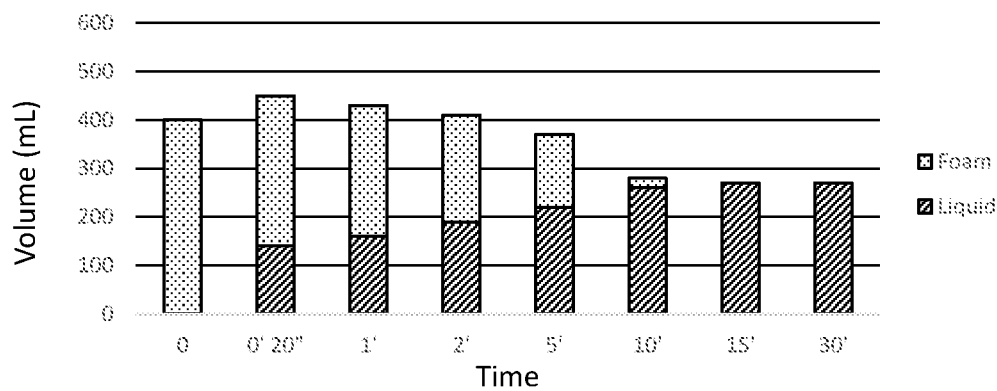

In Example 28, 230.6 g of whole milk and 36.0 g of coffee were mixed with 0.4 g of Gum A and 3.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for 11 minutes. The volume of the liquid phase and the foam phase over time is indicated below in Table 28. FIG. 36 is a graph of the volumes of the liquid phase and the foam phase of Example 28. The liquid phase had a viscosity of 750 cP. The most widespread bubbles in the foam phase had a diameter of 0.2 mm. The greatest volume of the foam phase was 400 mL, and the beverage stretched to a maximum volume of 180 mL above the initial volume of the beverage.

TABLE 28

Foam Duration of Example 28

| Time | 0 sec | 20 sec | 1 min | 2 min | 5 min | 10 min | 15 min | 30 min |
|---|---|---|---|---|---|---|---|---|
| Liquid (mL) | 0 | 140 | 160 | 190 | 220 | 260 | 270 | 270 |
| Foam (mL) | 400 | 310 | 270 | 220 | 150 | 20 | 0 | 0 |

Example 29

Figure 37:
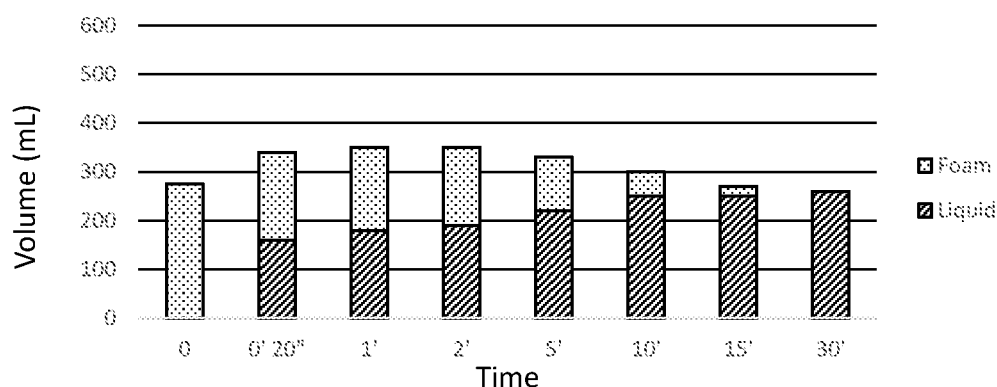

In Example 29, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 22 minutes. The volume of the liquid phase and the foam phase over time is indicated below in Table 29. FIG. 37 is a graph of the volumes of the liquid phase and the foam phase of Example 29. The liquid phase had a viscosity of 650 cP. The most widespread bubbles in the foam phase had a diameter of 0.5 mm. The greatest volume of the foam phase was 275 mL, and the beverage stretched to a maximum volume of 80 mL above the initial volume of the beverage.

TABLE 29

Foam Duration of Example 29

| Time | 0 sec | 20 sec | 1 min | 2 min | 5 min | 10 min | 15 min | 30 min |
|---|---|---|---|---|---|---|---|---|
| Liquid (mL) | 0 | 160 | 180 | 190 | 220 | 250 | 250 | 260 |
| Foam (mL) | 275 | 180 | 170 | 160 | 110 | 50 | 20 | 0 |

Example 30

Figure 38:
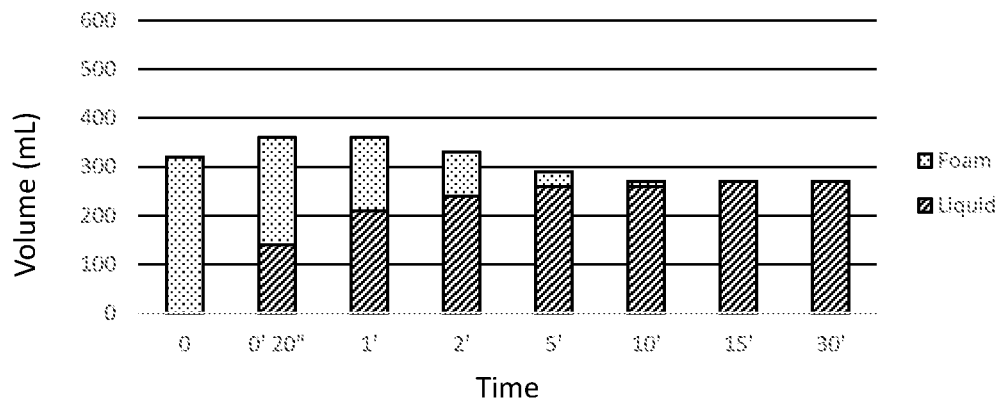

In Example 30, 214.0 g of whole milk, 48.0 g of coffee, and 8.0 g of cocoa and sugar were mixed and added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 12 minutes. The volume of the liquid phase and the foam phase over time is indicated below in Table 30. FIG. 38 is a graph of the volumes of the liquid phase and the foam phase of Example 30. The liquid phase had a viscosity of 100 cP. The most widespread bubbles in the foam phase had a diameter of 0.75 mm. The greatest volume of the foam phase was 320 mL, and the beverage stretched to a maximum volume of 90 mL above the initial volume of the beverage.

TABLE 30

Foam Duration of Example 30

| Time | 0 sec | 20 sec | 1 min | 2 min | 5 min | 10 min | 15 min | 30 min |
|---|---|---|---|---|---|---|---|---|
| Liquid (mL) | 0 | 140 | 210 | 240 | 260 | 260 | 270 | 270 |
| Foam (mL) | 320 | 220 | 150 | 90 | 30 | 10 | 0 | 0 |

Example 31

Figure 39:
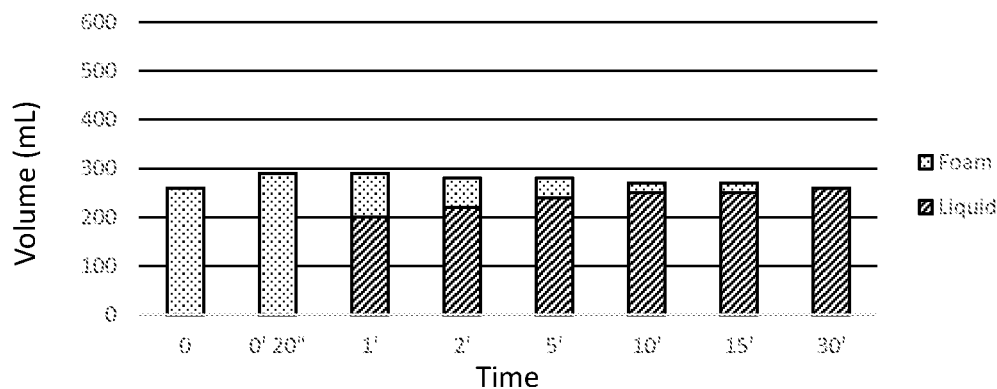

In Example 31, 210.0 g of whole milk, 46.6 g of coffee, and 6.0 g of cocoa and sugar were mixed with 0.6 g of Gum A and 6.8 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 26 minutes. The volume of the liquid phase and the foam phase over time is indicated below in Table 31. FIG. 39 is a graph of the volumes of the liquid phase and the foam phase of Example 31. The liquid phase had a viscosity of 2280 cP. The most widespread bubbles in the foam phase had a diameter of 0.05 mm. The greatest volume of the foam phase was 290 mL, and the beverage stretched to a maximum volume of 20 mL above the initial volume of the beverage.

TABLE 31

Foam Duration of Example 31

| Time | 0 sec | 20 sec | 1 min | 2 min | 5 min | 10 min | 15 min | 30 min |
|---|---|---|---|---|---|---|---|---|
| Liquid (mL) | 0 | 0 | 200 | 220 | 240 | 250 | 250 | 260 |
| Foam (mL) | 260 | 290 | 90 | 60 | 40 | 20 | 20 | 0 |

Example 32

Figure 40:
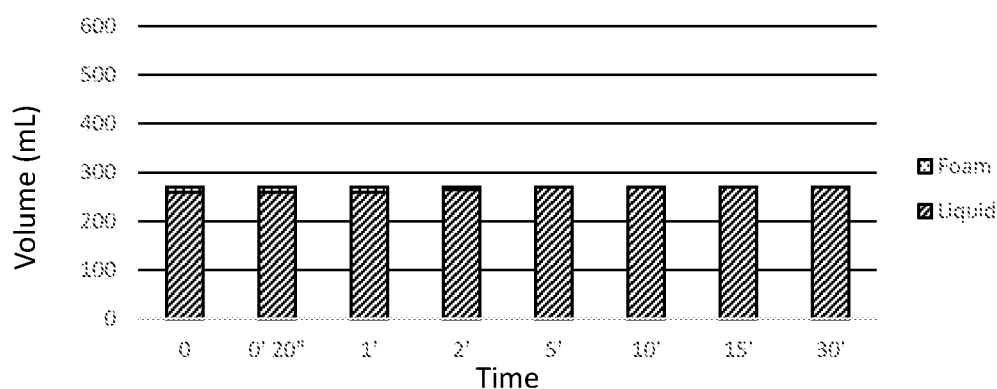

In Example 32, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 15 seconds at 9 Hz. After gassing and agitating the can, the final pressure inside the can was 10 psi. The can was then opened and the beverage poured into the 500 mL beaker. The beverage separated into a liquid phase and a foam phase, which persisted for only 3 minutes. The volume of the liquid phase and the foam phase over time is indicated below in Table 32. FIG. 40 is a graph of the volumes of the liquid phase and the foam phase of Example 32. The liquid phase had a viscosity of 650 cP. The most widespread bubbles in the foam phase had a diameter of 0.75 mm. The greatest volume of the foam phase was 10 mL, but no amount of stretch was discernible to the naked eye.

TABLE 32

Foam Duration of Example 32

| Time | 0 sec | 20 sec | 1 min | 2 min | 5 min | 10 min | 15 min | 30 min |
|---|---|---|---|---|---|---|---|---|
| Liquid (mL) | 260 | 260 | 260 | 265 | 270 | 270 | 270 | 270 |
| Foam (mL) | 10 | 10 | 10 | 5 | 0 | 0 | 0 | 0 |

Example 33

Figure 41:
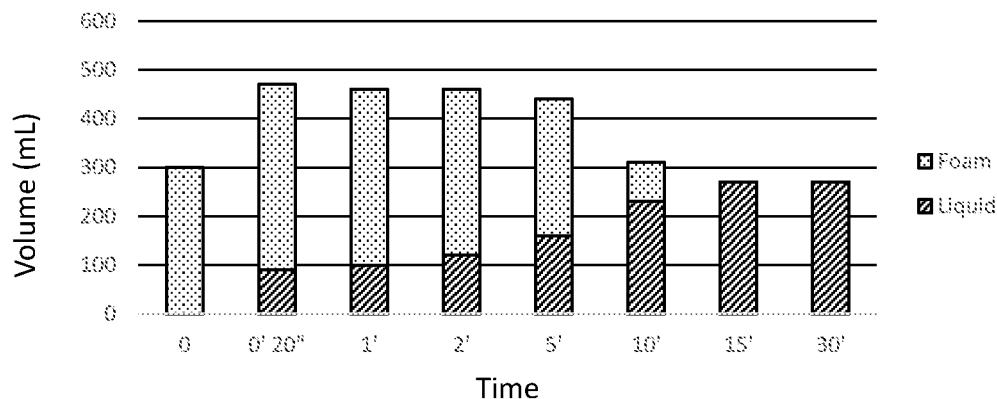

In Example 33, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for 14 minutes. The volume of the liquid phase and the foam phase over time is indicated below in Table 33. FIG. 41 is a graph of the volumes of the liquid phase and the foam phase of Example 33. The liquid phase had a viscosity of 650 cP. The most widespread bubbles in the foam phase had a diameter of 0.4 mm. The greatest volume of the foam phase was 380 mL, and the beverage stretched to a maximum volume of 200 mL above the initial volume of the beverage.

TABLE 33

| Foam Duration of Example 33 | | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 90 | 100 | 120 | 160 | 230 | 270 | 270 |
| Foam (mL) | 300 | 380 | 360 | 340 | 280 | 80 | 0 | 0 |

Example 34

Figure 42:
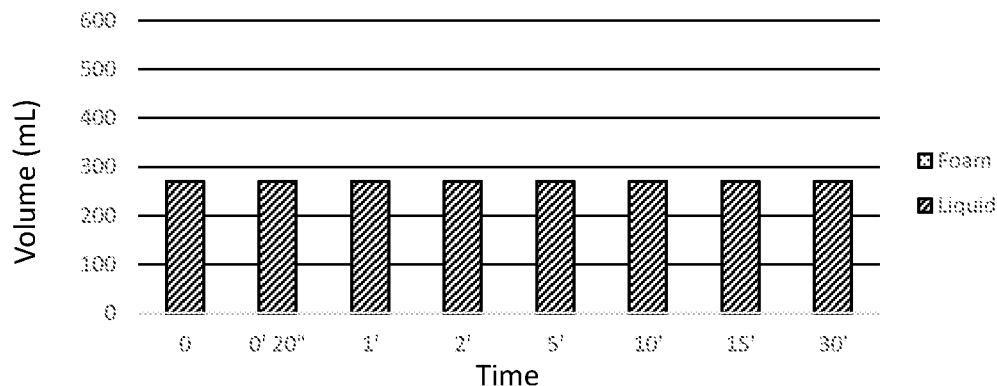

In Example 34, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. No foam phase formed in the beaker, and no amount of stretch was discernible to the naked eye. The volume of the liquid over time is indicated below in Table 34. FIG. 42 is a graph of the volumes of the liquid phase of Example 34. The liquid phase had a viscosity of 650 cP.

TABLE 34

| Foam Duration of Example 34 | | | | | | | | |
|---|---|---|---|---|---|---|---|---|
| Time | 0 sec | 20 sec | 1 min | 2 min | 5 min | 10 min | 15 min | 30 min |
| Liquid (mL) | 270 | 270 | 270 | 270 | 270 | 270 | 270 | 270 |
| Foam (mL) | 0 | 0 | 0 | 0 | 0 | 0 | 0 | 0 |

Example 35

Figure 43:
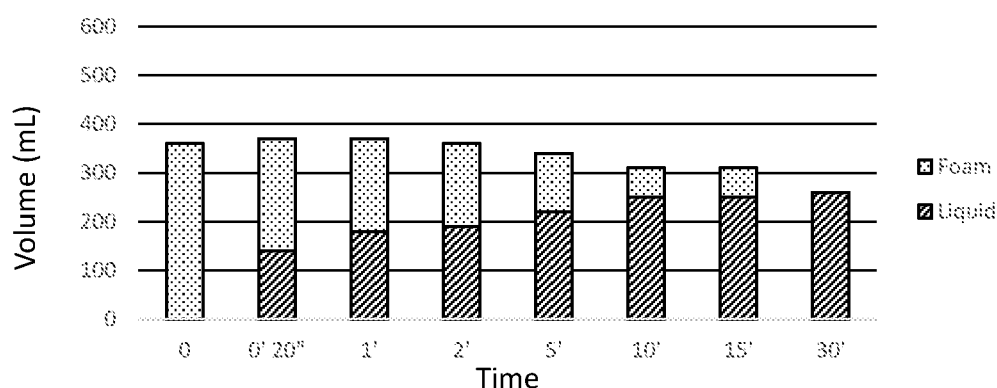
Figure 44:
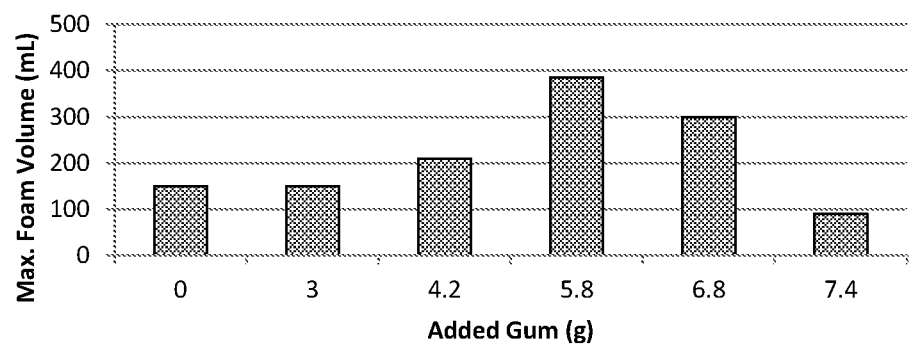

In Example 35, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for 25 minutes. The volume of the liquid phase and the foam phase over time is indicated below in Table 35. FIG. 43 is a graph of the volumes of the liquid phase and the foam phase of Example 35. The liquid phase had a viscosity of 650 cP. The most widespread bubbles in the foam phase had a diameter of 0.2 mm. The greatest volume of the foam phase was 360 mL, and the beverage stretched to a maximum volume of 100 mL above the initial volume of the beverage.

TABLE 35

| Foam Duration of Example 35 | | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 140 | 180 | 190 | 220 | 250 | 250 | 260 |
| Foam (mL) | 360 | 230 | 190 | 170 | 120 | 60 | 60 | 0 |

Example 36

In Example 36, a number of additional beverages were produced with a mocha base having added levels of gum (i.e., mixtures of whole milk, coffee, chocolate, and sugar). As shown below in table 36, beverages were produced with 0 g, 3.0 g, 4.2 g, 5.8 g, 6.8 g, and 7.4 grams of added gum. The beverages were added to a 9 fl. oz. can as described above. Nitrous oxide was added to the cans while agitating for 15 second at 9 Hz. After gassing and agitating the cans the final pressure inside the cans was 40 psi. Each can was then opened and the beverage poured into the 500 mL beaker. The volume of foam after 1 minute was measured for each beverage.

TABLE 36

| Foam Volumes of Example 36 | |
|---|---|
| Added Gum (g) | Foam Volume after 1 minute (mL) |
| 0 | 150 |
| 3 | 150 |
| 4.2 | 210 |
| 5.8 | 385 |
| 6.8 | 300 |
| 7.4 | 90 |

Example 37

Figure 45:
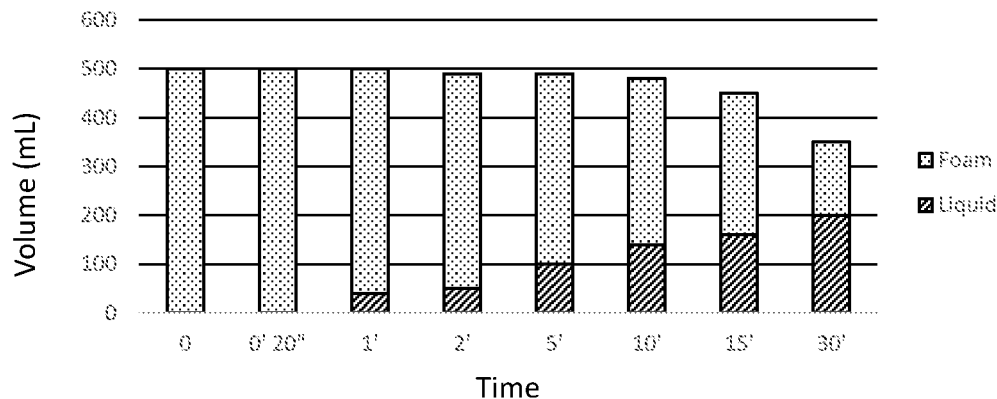

In Example 37, 265.5 g of orange juice was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for more than 30 minutes. The volume of the liquid phase and the foam phase over time is indicated below in Table 37. FIG. 45 is a graph of the volumes of the liquid phase and the foam phase of Example 37. The liquid phase had a viscosity of 1310 cP. The most widespread bubbles in the foam phase had a diameter of 0.1 mm. The greatest volume of the foam phase was 500 mL, and the beverage stretched to a maximum volume of 230 mL above the initial volume of the beverage.

29

TABLE 37

| | Foam Duration of Example 37 | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 0 | 40 | 50 | 100 | 140 | 160 | 200 |
| Foam (mL) | 500 | 500 | 460 | 440 | 390 | 340 | 290 | 150 |

Example 38

Figure 46:
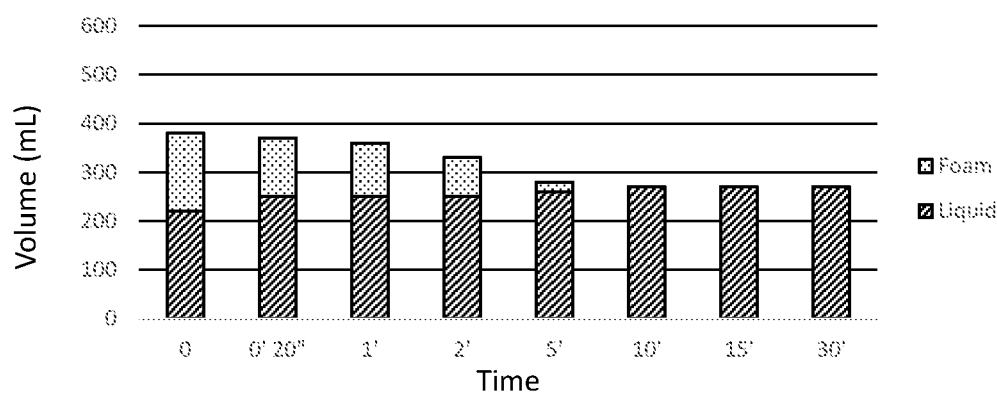

In Example 38, 270.0 g of orange juice was added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 6 minutes. The volume of the liquid phase and the foam phase over time is indicated below in Table 38. FIG. 46 is a graph of the volumes of the liquid phase and the foam phase of Example 38. The liquid phase had a viscosity of 150 cP. The most widespread bubbles in the foam phase had a diameter of 0.8 mm. The greatest volume of the foam phase was 160 mL, and the beverage stretched to a maximum volume of 100 mL above the initial volume of the beverage.

TABLE 38

| | Foam Duration of Example 38 | | | | | | | |
|---|---|---|---|---|---|---|---|---|
| Time | 0 sec | 20 sec | 1 min | 2 min | 5 min | 10 min | 15 min | 30 min |
| Liquid (mL) | 220 | 250 | 250 | 250 | 260 | 270 | 270 | 270 |
| Foam (mL) | 160 | 120 | 110 | 80 | 20 | 0 | 0 | 0 |

Example 39

Figure 47:
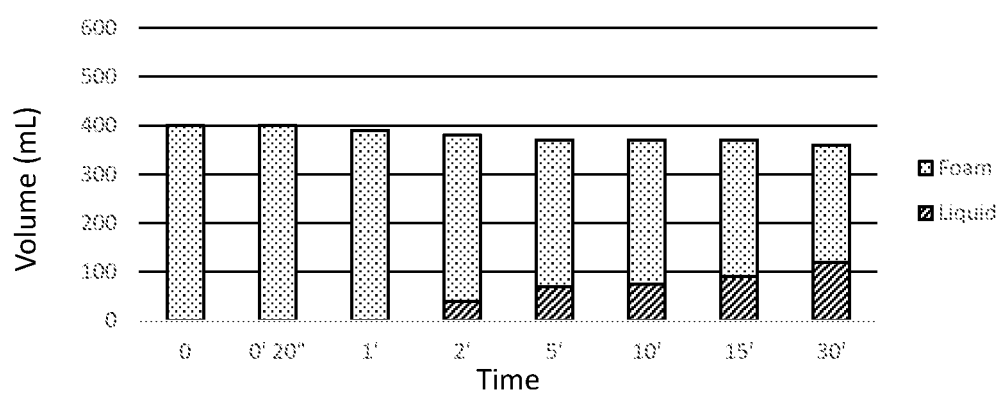

In Example 39, 261.0 g of orange juice was mixed with 1.0 g of Gum A and 8.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 39. FIG. 47 is a graph of the volumes of the liquid phase and the foam phase of Example 39. The liquid phase had a viscosity of 2449 cP. The most widespread bubbles in the foam phase had a diameter of 0.1 mm. The greatest volume of the foam phase was 400 mL, and the beverage stretched to a maximum volume of 130 mL above the initial volume of the beverage.

TABLE 38

| | Foam Duration of Example 39 | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | | 0 | 40 | 70 | 75 | 90 | 120 |
| Foam (mL) | 400 | 400 | 390 | 340 | 300 | 295 | 280 | 240 |

30

Example 40

Figure 48:
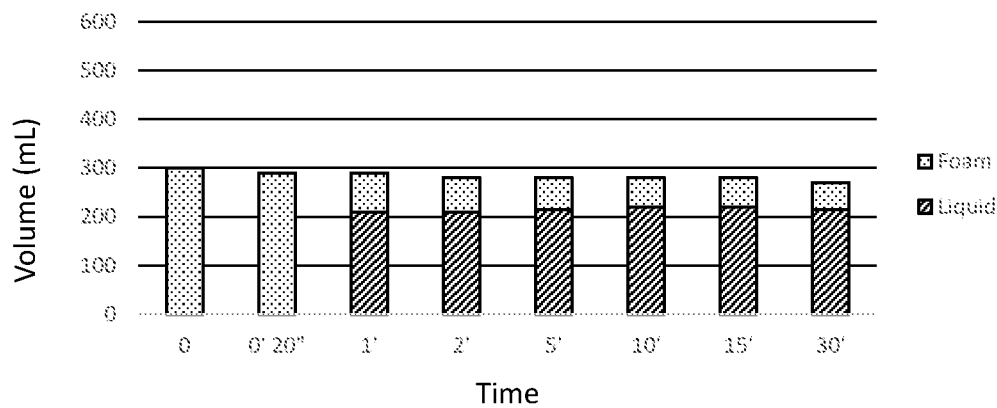

In Example 40, 265.5 g of orange juice was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 20 psi. The can was then opened and the beverage poured into the 500 mL beaker. The beverage separated into a liquid phase and a foam phase, which persisted for over 30 minutes. The volume of the liquid phase and the foam phase over time is indicated below in Table 40. FIG. 48 is a graph of the volumes of the liquid phase and the foam phase of Example 40. The liquid phase had a viscosity of 1310 cP. The most widespread bubbles in the foam phase had a diameter of 0.1 mm. The greatest volume of the foam phase was 300 mL, and the beverage stretched to a maximum volume of 30 mL above the initial volume of the beverage.

TABLE 39

| | Foam Duration of Example 40 | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 0 | 210 | 210 | 215 | 220 | 220 | 215 |
| Foam (mL) | 300 | 290 | 80 | 70 | 65 | 60 | 60 | 55 |

Example 41

Figure 49:
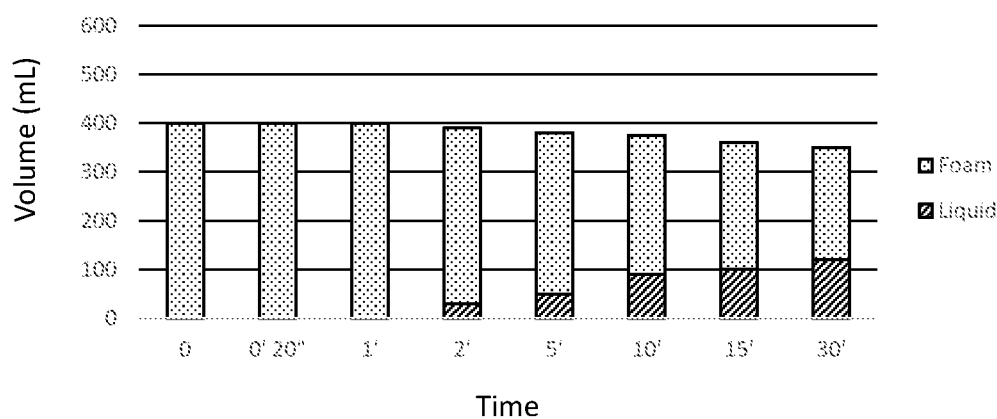

In Example 41, 265.5 g of orange juice was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for over 30 minutes. The volume of the liquid phase and the foam phase over time is indicated below in Table 42. FIG. 49 is a graph of the volumes of the liquid phase and the foam phase of Example 41. The liquid phase had a viscosity of 1310 cP. The most widespread bubbles in the foam phase had a diameter of 0.3 mm. The greatest volume of the foam phase was 400 mL, and the beverage stretched to a maximum volume of 130 mL above the initial volume of the beverage.

TABLE 40

| | Foam Duration of Example 41 | | | | | | | |
|---|---|---|---|---|---|---|---|---|
| Time | 0 sec | 20 sec | 1 min | 2 min | 5 min | 10 min | 15 min | 30 min |
| Liquid (mL) | 0 | 0 | 0 | 30 | 50 | 90 | 100 | 120 |
| Foam (mL) | 400 | 400 | 400 | 360 | 330 | 285 | 260 | 230 |

Example 42

Figure 50:
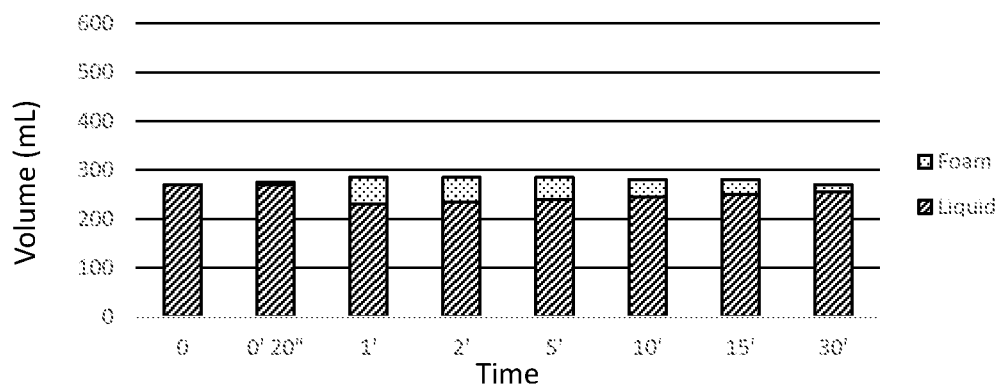

In Example 42, 265.5 g of orange juice was mixed with 0.5 g of Gum A and 4.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 42. FIG. 50 is a graph of the volumes of the liquid phase and the foam phase of Example 42. The liquid phase had a viscosity of 1310 cP. The most widespread bubbles in the foam phase had a diameter of 0.4 mm. The greatest volume of the foam phase was 55 mL, and the beverage stretched to a maximum volume of 15 mL above the initial volume of the beverage.

TABLE 42

Foam Duration of Example 42

| Time | 0 sec | 20 sec | 1 min | 2 min | 5 min | 10 min | 15 min | 30 min |
|---|---|---|---|---|---|---|---|---|
| Liquid (mL) | 270 | 270 | 230 | 235 | 240 | 245 | 250 | 255 |
| Foam (mL) | 0 | 5 | 55 | 50 | 45 | 35 | 30 | 15 |

Example 43

Figure 51:
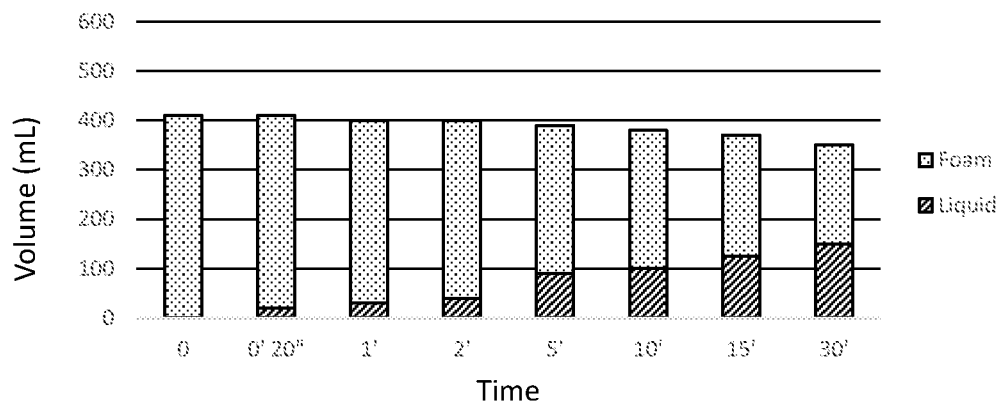

In Example 43, 265.5 g of orange juice was mixed with 0.5 g of Gum A and 4.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 43. FIG. 51 is a graph of the volumes of the liquid phase and the foam phase of Example 43. The liquid phase had a viscosity of 1310 cP. The most widespread bubbles in the foam phase had a diameter of 0.2 mm. The greatest volume of the foam phase was 410 mL, and the beverage stretched to a maximum volume of 140 mL above the initial volume of the beverage.

TABLE 43

Foam Duration of Example 43

| Time | 0 sec | 20 sec | 1 min | 2 min | 5 min | 10 min | 15 min | 30 min |
|---|---|---|---|---|---|---|---|---|
| Liquid (mL) | 0 | 20 | 30 | 40 | 90 | 100 | 125 | 150 |
| Foam (mL) | 410 | 390 | 370 | 360 | 300 | 280 | 245 | 200 |

Example 44

Figure 52:
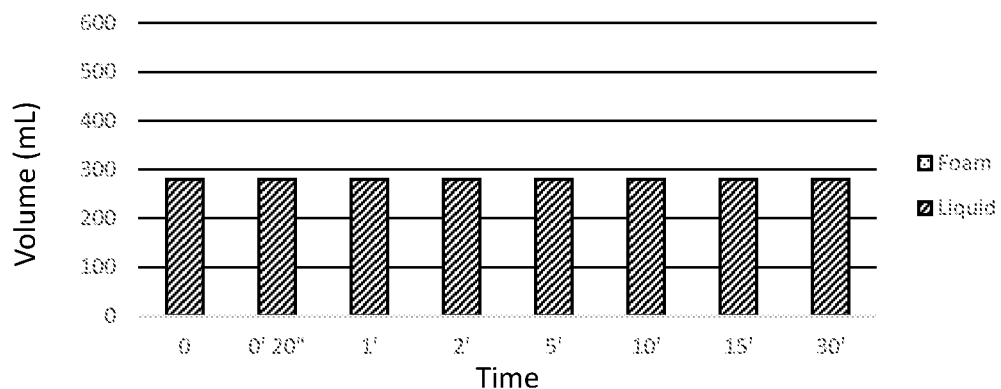

In Example 44, a Starbucks Frappuccino was opened and poured into a 500 mL beaker. The product was flat with no dissolved gas, and produced no foam when poured into the beaker. The volume of the liquid phase and the foam phase over time is indicated below in Table 44. FIG. 52 is a graph of the volumes of the liquid phase and the foam phase of Example 44.

TABLE 44

Foam Duration of Example 44

| Time | 0 sec | 20 sec | 1 min | 2 min | 5 min | 10 min | 15 min | 30 min |
|---|---|---|---|---|---|---|---|---|
| Liquid (mL) | 280 | 280 | 280 | 280 | 280 | 280 | 280 | 280 |
| Foam (mL) | 0 | 0 | 0 | 0 | 0 | 0 | 0 | 0 |

Example 45

Figure 53:
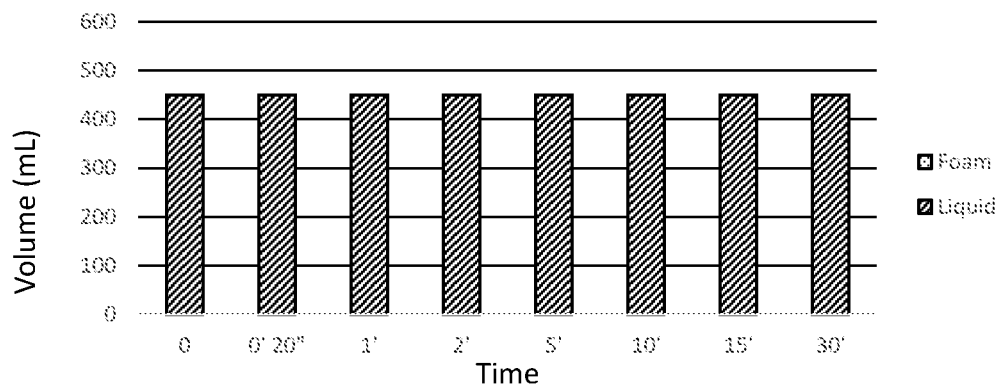

In Example 45, a Java Monster from Monster Energy The can was then opened and the beverage poured into the 500 mL beaker. Java Monster is a lightly carbonated product. A thin layer of foam appeared on the surface of the liquid two minutes after being poured into the beaker and rapidly disappeared. The volume of the liquid phase and the foam phase over time is indicated below in Table 45. FIG. 53 is a graph of the volumes of the liquid phase and the foam phase of Example 45.

TABLE 45

Foam Duration of Example 45

| Time | 0 sec | 20 sec | 1 min | 2 min | 5 min | 10 min | 15 min | 30 min |
|---|---|---|---|---|---|---|---|---|
| Liquid (mL) | 450 | 450 | 450 | 449 | 450 | 450 | 450 | 450 |
| Foam (mL) | 0 | 0 | 0 | 1 | 0 | 0 | 0 | 0 |

CONCLUSIONS

As observed from the above examples, the combination of gum, pressurization, and agitation is necessary to create a substantial amount of durable foam. All tests which included no gum (Examples 2, 9, 16, 23, 30, and 38), reduced pressure (Examples 4, 11, 18, 25, 32, and 40), or reduced agitation (Examples 6, 13, 20, 27, 34, and 42) showed a reduced amount of foam or foam duration when compared to the respective baseline test (Examples 1, 8, 15, 22, 29, and 37). Further, it is apparent that the method described herein will work with any liquid base. None of the test beverages (water (Examples 1-7), coffee (Examples 8-14), whole milk (Examples 15-21), latte (i.e., a mixture of coffee and milk) (Examples 22-28), mocha (i.e., a mixture of coffee, milk, cocoa, and sugar) (Examples 29-35), and orange juice (Examples 37-43)) failed to foam for at least one combination of variables.

The addition of gum to the base liquid serves at least three purposes. First, it thickens the base liquid in a way that may be more pleasing to drink. Second, once the container is opened, the gum traps the gas that exits the base liquid and forms bubbles. Although some of the test base liquids were sufficiently viscous to foam without the addition of gum, the foam phase duration was greatly increased by the gum. The gum further serves as a limiter on bubble size by forming a stronger, thicker bubble wall which resists stretching by the trapped gas. This results in finer bubbles which are perceived as silkier and creamier than foams with large bubbles.

Increasing the pressure inside the can produces more foam which persists for a longer period of time by increasing the volume of gas dissolved in the base liquid and available to produce bubbles. However, simply adding more gas alone is not sufficient to cause the gas to dissolve. As can be seen from the above examples, increasing the agitation time results in large increases in foam volume by causing a substantial increase in the volume of dissolved gas. Absent agitation, the gas injected into the container simply collects in the headspace and escapes the container once opened. Headspace gas cannot be trapped by the gum-supported bubbles and therefore does not result in foaming. In other words, the amount of dissolved gas in the liquid mixture is dependent on both the pressure inside the container and the degree of agitation. Low pressure, low agitation, or both will result in low amounts of dissolved gas. Increasing the pressure, agitation, or both will increase the amount of dissolved gas until the liquid mixture is saturated.

Accordingly, the production of foam is based on two factors: amount of gum and volume of dissolved gas. Each bubble can be considered a balloon which is inflated by the dissolved gas, but becomes harder to inflate as the balloon wall becomes thicker as a result of increased gum. Low amounts of dissolved gas results in a lack of foam because there is little gas to be trapped and the liquid lacks the ability to trap whatever gas is available. Low amounts of dissolved gas and high amounts gum leads to a slow cascading effect, but a low stretch and a weak microfoam. High amounts of dissolved gas and low amounts of gum leads to a dry foam which quickly stretches to large volumes. High amounts of dissolved gas and high amounts of gum lead to a medium stretch and a cascading effect which results in a strong and durable microfoam. However, there are levels beyond which additional gum is not beneficial, as illustrated by Example 36. Too much gum results in bubble walls which are too thick to be expanded by the dissolved gas, resulting in an overall decrease in the amount of gum. Optimal amounts of gum and dissolved gas will depend on the desired foam properties and the characteristics of the underlying base liquid. For example, base liquids which are more viscous will require lower amounts of gum in order to achieve the same effect.

The foregoing description of exemplary embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed:

1. A container adapted to hold a pressurized liquid beverage product, the container comprising:
    a sidewall connected to a base at one end and a top at the opposite end, the base sidewall and top, the container having a single internal chamber, the single internal chamber adapted to
        hold the pressurized liquid beverage comprising a base liquid and a gum, and
        be agitated;
    a one-way valve adapted to allow a gas to enter the internal chamber but not exit; and
    wherein the pressurized liquid mixture is adapted to be saturated with a volume of gas and the container is adapted to be pressurized at a pressure ranging from approximately 20 pounds per square inch, to approximately 60 pounds per square inch.

2. The container of claim 1, wherein the base liquid includes milk, coffee, fruit juice, or mixtures thereof.

3. The container of claim 2, wherein the base liquid includes a mixture of milk and coffee.

4. The container of claim 3, wherein the base liquid further includes chocolate.

5. The container of claim 1, wherein the gum includes acacia gum, guar gum, locust bean gum, carrageenan, pectin, xanthan gum, or mixtures thereof.

6. The container of claim 1, wherein the volume of gas includes nitrous oxide.

7. The container of claim 1, wherein the container is a can, bottle, or keg.

* * * * *